US008612779B2

(12) United States Patent
More et al.

(10) Patent No.: US 8,612,779 B2
(45) Date of Patent: Dec. 17, 2013

(54) POWER MANAGEMENT APPARATUS AND METHODS

(75) Inventors: Grant M. More, Edinburgh (GB); Holger Haiplik, Swindon (GB)

(73) Assignee: Wolfson Microelectronics plc, Edinburgh (GB)

( * ) Notice: Subject to any disclaimer, the term of this patent is extended or adjusted under 35 U.S.C. 154(b) by 453 days.

(21) Appl. No.: 12/841,515

(22) Filed: Jul. 22, 2010

(65) Prior Publication Data

US 2011/0022859 A1    Jan. 27, 2011

Related U.S. Application Data

(60) Provisional application No. 61/227,947, filed on Jul. 23, 2009.

(30) Foreign Application Priority Data

Jul. 22, 2009  (GB) .................................. 0912756.4

(51) Int. Cl.
G06F 1/00    (2006.01)
G06F 1/26    (2006.01)
G06F 1/32    (2006.01)

(52) U.S. Cl.
USPC .......................................... 713/300; 713/320

(58) Field of Classification Search
USPC ................................................. 713/300, 320
See application file for complete search history.

(56) References Cited

U.S. PATENT DOCUMENTS

| | | | |
|---|---|---|---|
| 4,674,031 A * | 6/1987 | Siska, Jr. ............................ | 700/79 |
| 5,502,689 A | 3/1996 | Peterson et al. | |
| 5,546,590 A * | 8/1996 | Pierce ............................ | 713/323 |
| 5,623,677 A * | 4/1997 | Townsley et al. .............. | 713/310 |
| 6,011,322 A * | 1/2000 | Stumfall et al. ................ | 307/43 |
| 6,038,671 A | 3/2000 | Tran et al. | |
| 6,286,106 B1 * | 9/2001 | Flannery ........................ | 713/310 |
| 6,369,466 B1 | 4/2002 | Murphy | |
| 6,931,555 B2 * | 8/2005 | Osborn .......................... | 713/310 |
| 7,310,740 B2 * | 12/2007 | Price et al. ..................... | 713/320 |
| 7,747,971 B1 * | 6/2010 | Chopra et al. ................. | 716/136 |
| 8,245,062 B1 * | 8/2012 | Nanda et al. ................... | 713/320 |
| 8,255,725 B2 * | 8/2012 | Shimazaki et al. ........... | 713/323 |
| 2006/0047980 A1 | 3/2006 | Price et al. | |
| 2006/0117192 A1 | 6/2006 | Nokkonen | |
| 2007/0200593 A1 | 8/2007 | Agarwal et al. | |

(Continued)

FOREIGN PATENT DOCUMENTS

WO    WO 2008/149257 A2    12/2008

*Primary Examiner* — Mark Connolly
(74) *Attorney, Agent, or Firm* — Dickstein Shapiro LLP

(57) ABSTRACT

Power management integrated circuits (PMICs) and related methods. In one aspect a PMIC which is operable to provide a plurality of PMIC power states is arranged to provide a predetermined delay before a power state transition. The delay is applied after receipt by the PMIC control circuitry of a power state transition command. Applying a delay allows time for the system powered by the PMIC to perform any necessary shut-down procedures and terminate active processes before power is removed, preventing corruption of the system. The delay is preferably configurable. The PMIC may also be arranged to control power converters which are external to the PMIC. In another aspect the PMIC has translation circuitry for providing the control settings of one power block, e.g. power converter, with any necessary modifications to be used by another power block. This means that only one set of control settings needs to be updated to change the output of both power blocks simultaneously.

29 Claims, 5 Drawing Sheets

(56) References Cited

U.S. PATENT DOCUMENTS

| | | |
|---|---|---|
| 2007/0234083 A1 | 10/2007 | Lee |
| 2007/0250721 A1 | 10/2007 | Searles et al. |
| 2008/0036434 A1 | 2/2008 | Miyazaki |
| 2008/0136397 A1 | 6/2008 | Gunther et al. |
| 2008/0280656 A1 | 11/2008 | Gonikberg et al. |
| 2008/0307240 A1* | 12/2008 | Dahan et al. ............. 713/320 |
| 2009/0061952 A1 | 3/2009 | Wu et al. |
| 2010/0019837 A1* | 1/2010 | Rozen et al. ............. 327/544 |

* cited by examiner

POWER MANAGEMENT APPARATUS AND METHODS

This application claims the benefit of U.S. Provisional Application No. 61/227,947, filed Jul. 23, 2009.

BACKGROUND OF THE INVENTION

1. Field of the Invention

This invention relates to the field of power management and power management apparatus, in particular power management integrated circuits, for supplying and regulating power to electrical devices, in particular to portable electrical devices.

2. Description of the Related Art

Many electrical devices include some sort of power management functionality. A power management unit, which is typically a power management integrated circuit (PMIC), is typically arranged to receive power from a power supply, which may be one of a plurality of possible power supplies, and provide appropriately controlled and regulated power to one or more power domains within the device in response to the power requirements thereof. As used in this specification the term "device" is used to refer to an electrical product, for example a mobile telephone, media player or personal computer and the like.

The power requirements of such electrical devices may vary depending on the usage of the device and also any power settings applied to a device in a particular mode of operation. For example consider an electrical device having a processor such as a CPU. A high clock speed may be required during periods when there is a lot of processing to be performed, for instance when performing processor intensive tasks. However when performing tasks which are not so processor intensive a lower clock frequency may still give acceptable performance and such a lower frequency would offer direct power savings. The voltage supplied to the processor can often be reduced at lower clock frequencies.

To conserve power the processor may therefore be arranged to vary its clocking frequency in accordance with its loading and the power management unit may be arranged to vary the supply voltage supplied to the processor accordingly.

Electrical devices may also be arranged to have a number of different operational states with the functionality of the device being different in each operational state. For example an electrical device may be arranged to have a device On state, where the device is functioning and a device Off state where the device main functionality of the device is off or dormant. The device may also have a sleep or stand-by device state which is a low power state.

To provide for the various device operational states the PMIC is therefore arranged to provide a plurality of PMIC power states. There may not be a one-to-one correspondence between PMIC power states and device operational states. There may for instance be many device On states involving enabling and disabling various circuit blocks within a common power domain which would be indistinguishable in terms of PMIC configuration, so would all map to a single PMIC ON state. To avoid confusion herein, PMIC power states are denoted by block capitals, device operational states are not.

The PMIC may provide a PMIC ON state where power is supplied to the majority of the device sub-systems. The PMIC may also provide one or more PMIC SLEEP states where several device functions may be unpowered or operating at much reduced power levels but some device sub-systems such as device memory or communication modules for example remain powered. In a PMIC OFF state the majority of device functions may be unpowered but, in some devices, there may be various functions, such as a real time clock for example, which remain powered by an internal battery.

Some PMICs may provide more than one ON state or different types of SLEEP state which can allow a device to have different functionality. SLEEP states are sometimes referred to as STAND-BY or HIBERNATE states. The term "SLEEP state" will be used throughout this specification as a non-limiting example of a power state of a PMIC and will be taken to include STAND-BY and HIBERNATE power states. The skilled person will appreciate however that what a system architect might designate as a PMIC SLEEP state may, in some devices provide greater functionality than what is designated as an ON state.

Various device functions, i.e. device sub-systems, that are separately powered may form separate power domains within the device. Power domains may also exist where different sub-systems within the device operate at different voltages. A power domain therefore comprises one or more device sub-systems which receive a common power supply. Different power domains may be powered independently of one another and/or supplied with different voltages to one another. Different parts of a single chip may be implemented in different power domains. A single power domain may however comprise multiple chips within a device, or even parts of multiple chips.

The power management unit is therefore typically arranged with a plurality of power blocks, each power block being mapped and connected to a particular power domain to control and regulate the power supply thereto. As used herein the term "power block" refers to circuitry for providing an appropriate power supply to an individual power domain, i.e. to circuitry for controllably supplying power to a load (the relevant power domain) using the supplies available to the PMIC. The power blocks, which typically comprise some sort of voltage regulator (e.g. a linear regulator, a switch-mode converter using an inductance or a charge pump or any combination thereof) or power switch, are typically arranged with various configuration settings that allow parametric control of the power blocks. For example the output voltage configuration may be controlled.

Power state transitions, i.e. a transition from one power state of the power management unit, e.g. ON, SLEEP or OFF, to another different state, may be initiated in various ways. For instance a main control button operable by the user could be used to initiate a power state transition of the power management unit, for instance from SLEEP to ON or vice versa. Similarly a user initiated power state transition of the power management unit could be triggered through receipt of a command through an appropriate communications interface of the device, e.g. an infrared or RF receiver, which is then transmitted over a suitable command and control bus to the power management unit. A user initiated power state transition of the power management unit could be triggered through receipt of a command from a touch screen interface or accelerometer in the device.

The operating system of the device itself may also be arranged to initiate a transition of power state of the power management unit based on activity of the device. For instance a device which is not performing any user initiated tasks may, for example, instruct the power management unit to transition from the ON state to the SLEEP state after a certain period of inactivity. A device with a power management unit in a SLEEP state may initiate transition of the power management unit to an ON state if some active monitoring circuitry detects some activity, e.g. receipt of some incoming data or a user using a human machine interface such as a keypad or the like. For instance a mobile telephone in a device stand-by state in which the power management unit is in a low power SLEEP state may be arranged to be able to detect an incoming call to be able to wake up if an incoming call is detected. In this example the RF receiver will remain powered by the power management unit in this SLEEP state.

A power state transition may also be initiated by the power management unit itself. For example, where the only available power supply is an internal battery, a power state transition to the OFF power state may be initiated if the battery level drops below a certain threshold.

In a power state transition at least one power domain of the device may typically transition from being active to being inactive or vice versa. For example in response to a shut down command the power management unit may stop supplying power to all sub-systems of a device apart from sub-systems for detecting a start up command (e.g. a power button arrangement and/or an infrared or RF receiver) and possibly a real time clock system. On a subsequent start up command the power management unit may supply power to all device sub-systems again.

In some devices it is beneficial to shut various device sub-systems down in a predetermined order. At least some of the power domains of the device may be connected to one another, possible via level shifting circuitry. Depending on the various circuits forming the power domains there may be a need to power some domains before others in a device start-up procedure and/or remove power from some power domains before others in a shut-down process to avoid any problems with analogue latch-up or back-powering of domains resulting in corruption of device operation or damage to the device.

Power management units may therefore be provided with a sequencer for activating and deactivating the power blocks which supply the various power domains within the device in a predetermined sequence. The required sequence is stored in memory that is readable by the power management unit. A power state transition, triggered by a power state transition command, may therefore involve controlling the appropriate power blocks to power and/or depower, i.e. to remove power from or to power down, different power domains within the device in the predetermined sequence.

One possible problem in applying power state transitions is that, for some electrical devices, the operating system of the device may be running various processes at the time that the power state transition command, i.e. a command for the power management unit to change from its present power state to a different power state, is issued. The power state transition command could be issued for a number of different reasons and, as mentioned above, could be issued at any time by a user hitting a power switch say or in response to a low battery detection by the power management unit. Thus an operating system of the device may not be in control over when a power state transition command is issued and may be performing a critical function when the command is issued.

For example some devices are arranged so that a device in an On state which is entering a low power state, (corresponding to the power management unit transitioning from an ON power state to a SLEEP power state), will store the current state of the operating system in a memory so the device can restore to the same state on transition back to the On state.

If the power management unit removes power to a critical part of the system, prior to successful termination of the critical processes or completion of a memory storing step this may lead to system instability, corruption or malfunction.

To address this problem various handshaking arrangements have been proposed. For instance one approach uses a separate hardware pin arrangement for communicating power state change requests between the operating system and the power management unit. The operating system only issues a power state transition command after most processes have been successfully terminated. However such handshaking arrangements typically require relatively complex hardware, which adds to the complexity and expense of the device, and may not be fully effective as the operating system needs to be active to some extent to perform the handshaking itself so not everything can be terminated.

To avoid corruption system architects often ensure that significant parts of the device remain powered in a power management unit SLEEP power state. This increases power consumption and reduces battery life compared to removing power from all non-functional device systems.

SUMMARY OF THE INVENTION

It is an object of the present invention to provide improved methods and apparatus for power management in electrical devices.

Thus according to a first aspect of the present invention there is provided a power management integrated circuit (PMIC) being operable, in use, to provide a plurality of power states, wherein the PMIC is configured to transition from a current power state to another power state in response to a power state transition command, and wherein the PMIC is arranged to provide a predetermined delay between receipt of a power state transition command and start of the appropriate power state transition.

This embodiment of the present invention is concerned with transitions between various power states of a PMIC and imposes a predetermined delay between receipt of a power state transition command and start of the appropriate power state transition. This predetermined delay allows time for an operating system of the device to correctly terminate any relevant processes, i.e. those involving parts of the system that are being deactivated, prior to the power state transition being enacted by the PMIC. If necessary the predetermined delay may also allow time for the system state to be written to memory.

This embodiment of the invention thus reduces the risk of corruption in a power state transition but avoids the need for any complicated handshaking arrangement between an operating system of the device and the PMIC.

Unlike the conventional approaches, which either ignore the potential problem or ensure that the actual commands which the PMIC acts upon are received after at least some of the relevant termination steps have been taken, this embodiment receives any power state transition commands in the PMIC as they are generated and then the PMIC applies a predetermined delay before acting on said command. Since the delay is applied by the PMIC, the delay can be easily applied to a power state transition command regardless of whence it originates, e.g. to commands generated by an operating system of the device, the PMIC itself or received from a communication interface via command/control signal lines.

This embodiment of the present invention therefore involves no restrictions either on when a power state transition command can be generated, or on requiring any confirmation from the system that it is safe for the PMIC to start the power state transition. The delay may be chosen to balance the expected maximum time for a safe termination process in the relevant device with the desire to ensure power state transitions occur as quickly as possible.

The PMIC may also be arranged to communicate receipt of a power state transition command to at least one other part of the device. The PMIC may therefore be arranged, on receipt of a power transition command, to send a power transition indication signal to at least one output of the PMIC. As mentioned above a power state transition command may be received from a number of different sources and may or may not be generated by the sub-systems of the device which are running the processes that need termination, i.e. the operating system of the device. Hence the parts of the device that provide the operating system may be unaware that a power state transition command has been generated. The PMIC therefore sends the power transition indication signal to one or more outputs of the PMIC. The one or more outputs may comprise a control and command output for sending control signals to the operating system of the device. This will allow the operating system of the device to be notified to run appropriate termination processes and to prevent initiation of any critical processes.

The PMIC may be arranged to send such a control signal in some power states and not others. For instance, if the current PMIC power state is the OFF power state, and thus the device is most likely to be inactive, no such control signal may be necessary. The PMIC may also be arranged to send such a control signal only if the power state transition command was not received from, or via, the operating system of the device, i.e. only if the operating system is not already aware of the power state transition command. The signal may be an interrupt signal sent to a device processor on an interrupt line.

Conveniently the predetermined delay has a duration which is sufficient for the operating system of the device to complete tasks it may be running, store the current state in memory if necessary and safely terminate all necessary processes. For a device with a simple operating system a delay in the order of 1 to 5 ms or greater may be sufficient. For operating systems that may be involved in processes such as writing to flash memory or downloading critical update data or the like it may be desirable to have a predetermined delay in the order hundreds or milliseconds, a second or more or a delay in the order of 10 s.

Conveniently the predetermined delay is configurable, i.e. the power management apparatus is arranged such that the duration of the predetermined delay is configurable. A PMIC may for example be configurable by on-chip non-volatile memory NVM such as one-time programmable (OTP) memory providing configuration data for on-chip control registers. The delay may be configurable to any desired duration or, at least, any duration within a set range. Alternatively the predetermined delay may be configurable between a plurality of pre-set values.

Allowing the pre-determined delay to be configurable means that the same PMIC can be used for a variety of different device applications where different delays may be appropriate. For example, in a first device having a simple processor running simple tasks the termination process may be relatively quick whereas in a second device where more processes are likely to be running the termination stage may take longer. The delay time may therefore be optimised for each different device. This embodiment of the present invention allows the same PMIC to be used for each device but the predetermined delay when used in the first device may be shorter than the predetermined delay when used with the second device.

The predetermined delay may also be configurable during device operation. A default predetermined delay could be stored in a non-volatile memory for use in the absence of other settings but the PMIC may be arranged to alter the delay in accordance with device usage based on control signals from e.g. the operating system of the device. For example if the operating system of the device is powered and operational but is not undertaking any user initiated tasks the predetermined delay may be set as a first delay allowing sufficient time for the system state to be stored in memory and the necessary operating system processes to be determined. If the user then initiates a task, for instance the user initiates audio playback from the device, the processing load will increase and new processes will be started. At this point the processor may instruct the PMIC to configure the predetermined delay to a second delay time should a power state command be received. The second delay may be greater than the first delay to allow additional time for the additional processes to be terminated. If the user initiates a different process which, for instance involved the device writing data to a flash memory the processor may send a control signal to the PMIC to set the predetermined delay to be a third delay. The third delay may be greater than the first and second delays to allow for the greater time required to correctly complete the data writing process to a stage where it can be terminated safely should a power transition command be generated. If no power state transition command is generated and the data writing process is completed the delay may then be set back to the first or second delay as appropriate.

Some devices that the PMIC could be used to power may not require any delay to be imposed before a power state transition, for instance because safe termination of processes is not an issue for that device. For such devices applying a delay between receipt of a power state transition command and start of the appropriate power state transition, whilst harmless, may be unnecessary. Therefore the PMIC may be configurable such that in one configuration there is a predetermined delay and in another configuration there is no delay between receiving a power state transition command and starting the appropriate power transition. Again this configurability allows the PMIC of this embodiment of the invention to be used for a variety of different devices.

For clarity it will be noted that the predetermined delay applied by the power management apparatus is applied in relation to a transition between different power states of the PMIC. The different power states of the PMIC may correspond to states of different functionality of the device. The different power states of the PMIC generally involve different power blocks being enabled in the different states, or outputting significantly different voltage levels but also they may involve a power block being operated in a different mode. The power states are defined by the design of the system and corresponding configuration of the PMIC.

The PMIC control circuitry itself will generally remain powered for as long as a power source is available. In other words the power domain or domains comprising the control circuitry, control registers and the like of the PMIC typically remain powered in the PMIC OFF state. It is generally the other power domains of the device, including other PMIC functions, which may be unpowered in an OFF or SLEEP power state.

For example, a device may have operational states operable with a PMIC ON state where full functionality is available and all power domains may be powered. For the power management apparatus this means that all power blocks which power a power domain are supplying current depending on usage. The device may also have an operational state operable with the PMIC in a SLEEP power state where only some domains are powered, for instance to maintain the system state in memory, to monitor for wake-up commands and for some domains to maintain a voltage level that will reduce the time taken for a device to wake-up. As mentioned the PMIC control circuitry and any volatile memory of the PMIC remains powered. The device may also have operational states operable with the PMIC in an OFF power state where most power domains of the device are unpowered and only those necessary for maintaining a real time clock for example or for monitoring for a start up command are active. This would involve only certain power blocks of the power management apparatus supplying power and these may be implemented as special blocks of the power management apparatus. A power block supplying power to the power domain comprising the PMIC control circuitry may also typically remain powered in PMIC OFF state. However the skilled person will appreciate that the PMIC may be configured so the PMIC control circuitry power supply is deactivated in an OFF state or a particular SLEEP state. The skilled person will be well aware of different power states and what constitutes a power state transition.

It will be appreciated of course that in any particular power state where sub-systems of the device are powered, the actual voltage level supplied may vary depending on the usage of the device. Thus the voltage supplied to a particular power domain may vary in accordance with device requirements and the voltage supplied to a particular device sub-system may depend on whether that sub-system is actually being used and what operations that sub-system is carrying out.

As an example consider a device having audio capability having a processor in one power domain, an audio sub-system in another power domain and a system memory in a third power domain. In the PMIC ON state all three of these power domains may be active and the relevant power blocks of the PMIC supply a voltage to all three power domains. The current consumed by the processor may vary according to usage. The voltage required by the processor may also vary depending on usage and, in response to appropriate commands from the processor, the PMIC may accordingly vary the voltage supplied to the processor by the appropriate power block. The current consumed by the audio sub-system will depend on whether any audio processing and output is required. If no audio system is required the processor may disable the audio sub-system locally, i.e. without involving the PMIC. The relevant power block of the PMIC still supplies voltages to the supply rails of the audio sub-system power domain, but the audio system is inactive and draws very little power. If subsequently audio is required the processor may locally enable the audio sub-system which will then become active and have a higher level of power consumption.

Any variation in current level supplied to the processor due to processing load is not a power state transition since the PMIC remains in the ON power state. The requested change in voltage level supplied to the processor due to anticipated processing load may be considered not to be a power state transition as the PMIC remains in the same ON power state, and this change in output voltage is under the control of the processor of the device, although it necessarily addresses the PMIC to actually vary the voltage settings for the relevant power blocks. Similarly the PMIC power block powering the audio sub-system power domain can provide a voltage supply in the ON state irrespective of the actual usage of the device. Local activation or deactivation of a device sub-system (i.e. by controlling settings in a power domain external to the PMIC) while affecting current consumed does not constitute a power state transition.

In some cases the device operating system may be arranged to control activation or deactivation of a power domain by instructing the PMIC to enable or disable a relevant power block, without changing the power state of the PMIC. For example a device with Wi-Fi capability may have an RF transceiver. If the user has disabled this feature by use of a software setting the power block supplying the RF transceiver may be disabled even though the PMIC is in and remains in the ON state. If the user subsequently enables Wi-Fi capability the processor may instruct the PMIC to enable the relevant power block. It will be clear however that this change is directly controlled by the device processor and does not constitute a power state transition of the PMIC. The PMIC is in and remains in the ON state.

In contrast, if say the user were to command the device to turn off, the processor would instruct the PMIC to initiate a power state transition from PMIC ON to PMIC OFF, rather than individually program the respective power blocks, including its own, to turn off. In cases of power state transitions, the device operating system may initiate a power state transition but does not carry out or control the power state transition. The power state transition is controlled by the PMIC as the device operating system may not be available by the end of the transition.

In should be noted that the specification of which power blocks are enabled or disabled in any given power state is generally stored in memory. A non-volatile memory is used to store default boot settings which are used when the PMIC is powered up from an unpowered state (or in certain reset situations). However when the PMIC is powered up these settings are typically loaded into registers and then maintained. Depending on the design of the PMIC the device operating system may be able to configure these settings when operational so as to alter the configuration of the power blocks in a PMIC power state. The PMIC, when performing a power state transition, will use whatever present settings it has when the transition commences to transition to the target power state.

In some PMICs the power blocks may have different configuration settings stored for at least some of the PMIC power states. For example a power block may have one set of configuration settings representing the operating parameters of the regulator in the PMIC ON state and another set of configuration settings indicating the operating parameters of the device in the PMIC SLEEP power state. The appropriate configuration settings will be used in the appropriate power state.

A power state transition is implemented by the PMIC controlling the appropriate power blocks of the power management apparatus. Continuing with the example above, in the PMIC ON power state a first power block supplies power to the processor in line with device requirements and the current power management settings, which may depend on a device operating mode, e.g. power saving, performance etc. Power is likewise supplied to the memory by a second power block and a third power block is arranged to supply power to the audio sub-system. In the PMIC SLEEP state the processor and audio sub-system may be inactive but the memory may remain powered to maintain the state of the operating system. Thus if the PMIC is in the ON state and is commanded to enter the SLEEP power state it sends a power state transition notification to the processor (if required) and then applies the predetermined delay. This allows time for the processor to write the system state to memory and safely terminate all necessary processes. After the predetermined delay the PMIC controls the first and third power blocks to stop supplying power, i.e. sends a disable signal to the first and third power blocks. The PMIC may also update the second power block with the stored settings for the SLEEP power state. This may result in an output voltage from the second power block which is sufficient to maintain the memory in a low power state.

The appropriate power state transition will clearly depend on the current power state and the requested power state. Depending on the configuration of the PMIC it may be possible to transition from the present power state to one or more of the other power states. For instance it may be possible to switch from the ON state to either the SLEEP state or to the OFF state or from the SLEEP state to either the ON state or the OFF state. Equally depending on the design or configuration of the PMIC some power state transitions may be forbidden. For example if a PMIC is provided with two SLEEP states, SLEEP1 and a deep sleep SLEEP2, it may be possible to go from state SLEEP1 to state SLEEP2 but the reverse transition may not be possible: from SLEEP2 the only transitions may be to the ON state or the OFF state.

The power state transition command may therefore indicate the destination power state. This may be achieved by an identifier in the power state transition command or may be inherent for power state transition commands received on certain channels. For instance a power state transition initiated by a battery charge level monitoring device may always imply a transition to the OFF state.

The appropriate power transition may involve removing or reducing the voltage supply to a plurality of power domains and, as mentioned above, it may be desirable in some devices to activate or deactivate the power domains in a predetermined order, i.e. the power state transition comprises a power state transition sequence. The power state transition sequence comprises appropriately controlling the various power blocks in the predetermined order. The PMIC may therefore comprise, or be adapted to communicate with, a sequencer for controlling the power blocks involved in a power state transition in a predetermined sequence.

It will be appreciated that a power state transition sequence may involve at least one power domain being activated or deactivated later than another power domain, in other words the enable/disable control signal for one power block is delayed relative to the control signal for another power block. It will be noted however that the embodiment of the present invention applies a delay prior to the start of the transitions, i.e. before the start of the sequence.

The apparatus may comprise delay circuitry implementing a hardware delay or a processing delay or both. Hardware delay includes analogue delays due to RC time constants or monostables using current sources and capacitors, processing delay includes digital delays such as produced by clocked counters. Conveniently however a processing delay represents an easy way to implement the necessary delay. A controller of the PMIC may be arranged such that once a power state transition command has been received it waits for a predetermined amount of time, e.g. for a predetermined number of clock cycles, before starting the power state transition, i.e. before sending appropriate control signals to the power supply units for the appropriate power domains. Where the power management apparatus includes a sequencer the delay may be implemented before initialising the sequencer to apply the appropriate sequence. It will be appreciated however that the controller may send an interrupt signal or the like to the operating system so that it is aware that a power state transition is going to occur.

Additionally or alternatively where the power management includes a sequencer the predetermined delay could be applied by the sequencer itself by reserving a plurality of the initial time slots of the sequencer as inactive. However sequencers generally operate with a limited number of available time slots and providing a plurality of additional slots purely to implement a delay is not the preferred approach. It should also be noted that there is likely to be a difference in scale between the duration of the predetermined delay and the duration of the time of a sequencer. A sequencer may typically use time slots of the order of 1 ms duration or so whereas, as noted above the predetermined delay could be of the order of 100 ms or 1 s or more.

As the predetermined delay is applied in order to allow various termination processes to be completed the power management apparatus may be adapted to apply the delay only to power state transitions that involve at least one power domain transitioning from being active to being inactive. Thus a power state transition which purely involves switching previously inactive or low powered domains into an active or higher powered state may be applied immediately after the relevant power state transition command is received. However such an arrangement does require the PMIC to be able to determine whether or not a power state transition command is one to which a delay should be applied or not. Whilst for devices where there are relatively few PMIC power states and relatively few permitted power state transitions this may not be too difficult to achieve, for instance by use of a simple look up table, it would nevertheless require additional storage capability. For devices where the PMIC is arranged to provide several different power states offering different functionality the number of possible power state transitions may be quite large.

It is therefore much simpler to implement a delay on receipt of any power state transition command, irrespective of whether it represents moving from a high power state to a low power state or from a low power state to a high power state.

In one embodiment the PMIC has control circuitry configurable to control at least one power block external to the PMIC and output power block control signals to at least one power block control output.

As mentioned above the ability to configure the delay allows the same design of PMIC to be used in a range of different devices. It will be understood however that different devices may have different numbers of power domains requiring separate power supplies. As an example consider a device having a processor, say a processor with an ARM™ based CPU, and system memory. Three power domains may be required for these device sub-systems, one for the processor core, one for the memory and one for an I/O sub-system allowing data exchange between the processor and the memory. Another device however, which may be a related device with different functionality, may be a dual processor device and may, for instance, have a DSP core in addition to the ARM™ CPU. The DSP core may represent an additional power domain requiring its own power block. Additionally some types of memory use more than one power domain to achieve power savings, for instance LP-DDR2 memory. Thus one device may require three power domains for its processor and memory sub-systems whereas a different device may require five power domains.

The PMIC is clearly manufactured as an integrated unit. The number of possible power blocks of the PMIC is determined at the time of schematic/layout design or mask tooling or even only when packaging/assembling the silicon die. It would clearly be possible to provide a PMIC which is arranged to have five power blocks intended for processor and memory sub-systems of a device. However this may result in redundant power blocks, and all associated control circuitry, when used with a device that only requires three power domains for a processor and memory. Providing redundant power blocks clearly has an implication on cost and size of the PMIC. Also, continued development of device systems may result in the need for more power domains for the device systems in the near future, yet the design and tooling costs for a different integrated circuit for each of multiple end applications make such a strategy uneconomic. Also high current or high voltage requirements for one or more domains may not be feasible to be satisfied using manufacturing technology chosen as appropriate for the rest of the circuitry on the PMIC.

This embodiment of the invention however allows use of additional power blocks, i.e. power blocks in addition to those integrated into the power management apparatus. These additional power blocks are external to the power management apparatus and are used to provide a separate power regulation function for additional power domains in the device. Additional power blocks can therefore be used in a device to regulate power to power domains of the device that can't be supplied from the power management apparatus. Thus a PMIC with three internal, integrated power blocks can be used in a device with three power domains. However the same PMIC can also be used in a device which has five power domains by connecting two external power blocks to the power block control output or outputs. This embodiment of the invention therefore increases the flexibility of the PMIC.

The control circuitry for controlling the at least one external power block may comprise sequencing circuitry for activating or deactivating the power blocks in a specified sequence in a transition from one power state to a different power state. The power block control signals output to the power block control may therefore comprise sequencing control signals. Thus the control circuitry on the PMIC can control the sequencing of the external power blocks in addition to the sequencing of the internal power blocks in a power state transition. Thus the external power blocks can be used to provide power to any power domain of the device and that power domain can be activated or deactivated at an appropriate time. The external power blocks can also be used to provide power to power domains that may be part of the operating system of the device. The PMIC will apply the predetermined delay before activating/deactivating any of the internal or external power blocks in a power state transition.

A power management apparatus according to this embodiment of the invention can therefore be used with at least one additional, external power block and the sequencing circuitry, which conveniently controls the sequencing of the power blocks integrated into the PMIC, can be configured to provide a sequence control signal for this at least one additional power block. The additional power block(s) can be connected to the power block control output interface and thus each additional power block can receive the sequencing control signals and be activated or deactivated at an appropriate time in the power transition sequence, as if it were simply another internal power block. Previously, if an additional power block had been used, it would have to be used for a power domain that could be activated or deactivated independently of all other power domains.

The sequencing circuitry may comprise a sequencer providing a plurality of time slots. Such sequencers are well known and are conventionally used for sequencing the integrated power blocks of a power management device. During each time slot a sequencing control signal may be sent to one or more power blocks to activate or deactivate those power blocks. The power blocks which are controlled in each time slot are stored in a memory accessible by the PMIC. The PMIC of this embodiment of the invention may therefore comprise at least one memory adapted to store a power state transition sequence for the plurality of integrated power blocks of the PMIC and at least one external power block. The sequencer may therefore need to have sufficient time slots to be able to correctly sequence the increased number of domains.

Additionally or alternatively the control circuitry may be arranged to provide control over the configuration settings of the external power blocks so as to allow control over any or all of the voltage output, any operating limits such as current limits or voltage settings or operating mode of the device. The control circuitry, which may also control the power blocks integrated into the PMIC, may be arranged to control the external power block as if it were another internal power block.

The power block control output allows for a connection to an additional power block and may for instance be a contact pad or pin or any other arrangement allowing communication of the sequencing control signal to an additional power block via an appropriate link. To allow for control of more than one additional power block there may be a plurality of power block control outputs, each receiving an appropriate control signal from the control circuitry.

A device may therefore comprise a PMIC and at least one additional power block, the additional power block being connected to the power block control output interface.

Each additional power block may be an individual external power block. In some embodiments however two or more additional power blocks may be integrated together, i.e. two or more additional power blocks may be provided as a single integrated circuit. Where two or more external power blocks are integrated on a single chip they may be arranged so that each has a separate control input or inputs, each connected to a separate power block control output on the PMIC, or alternatively a single power block control output may be used with the power blocks being controlled by separately addressable registers or some time-multiplexing scheme or the like.

At least one additional PMIC could additionally or alternatively be used to provide some additional power blocks. An additional PMIC may be arranged as a slave device to the master PMIC. The master PMIC may be arranged to send an enable or disable signal to the slave PMIC at an appropriate time. Thus the slave PMIC may be arranged to control the power blocks of the slave PMIC in a conventional fashion but the relative timing of the PMICs is controlled by the master PMIC. Alternatively the master PMIC could send control signals to the slave PMIC to control the power blocks of the slave PMIC.

In general then this aspect of the invention relates to a power management integrated circuit being operable, in use, to output a plurality of power states, wherein said integrated circuit is configured to transition from one power state to another power state in response to a control signal, and wherein said integrated circuit provides a predetermined delay between receipt of said control signal and the start of said transition. The predetermined delay may be configurable, i.e. the PMIC may be configurable between applying no delay or a delay of a certain duration and/or the duration of the delay may be configurable.

As mentioned above by allowing the predetermined delay to be configurable the same design of PMIC can be used with a variety of different device designs. Making the same PMIC for several different applications offers clear advantages in terms of cost, development, testing etc. Thus according to a second aspect of the invention there is provided a power management integrated circuit (PMIC) for managing power supply to a device, the PMIC being operable, in use, to provide a plurality of power states, wherein the PMIC is configured to transition from a current power state to another power state in response to a power state transition command, and wherein the PMIC is configurable so that a predetermined delay can be applied between receipt of a power state transition command and start of the appropriate power state transition.

This aspect of the present invention offers all the same advantages and can be implemented in any of the embodiments as describe above with reference to the first aspect of the invention.

In particular the PMIC of this aspect of the invention may be configurable so that the predetermined delay is any delay, or at least any delay within a set range. Additionally or alternatively the PMIC is also configurable so that no delay is applied between receipt of a power state transition command and start of the appropriate power transition sequence. The predetermined delay may be configured, in use, by the operating system of the device to take account of the processes active in the operating system.

In a third aspect of the invention there is provided a method of performing a power state transition in a device comprising the steps of:
  receiving in a power management integrated circuit of the device a power state transition command;
  applying a predetermined delay; and
  after said predetermined delay, starting the appropriate power transition.

This aspect of the invention also relates to a method of performing a power state transition in a PMIC comprising the steps of:
  receiving a power state transition command;
  applying a predetermined delay; and
  after said predetermined delay, starting the appropriate power transition.

The methods of this aspect of the invention offers all the same advantages as described above with reference to the first aspect of the invention and all the embodiments described above with reference to the first aspect of the invention are applicable to the method.

As mentioned above the various power domains in a device may be operable at different voltage levels. This allows optimisation of the supply voltage for each independent power domain. In some devices, power domains operating at different voltage levels may be interconnected, i.e. a power domain may receive signals from a power domain operating at a different voltage level.

The interconnection between power domains operating at different voltage levels may be provided with level shifting circuitry so that a signal received by a power domain is shifted to a voltage level appropriate for that domain. However level shifting circuitry is not applicable for all connections between power domains (e.g. analogue) and, in any case, adds to the cost and complexity of the device. Also a level shifting circuit may not work correctly or to the required delay over all combinations of input and output voltages.

Therefore restrictions may be imposed on the voltage levels of interconnected power domains in certain power states. For example, in the ON state, first and second power domains may be arranged to operate at the same voltage level or there may be a maximum allowed difference between the voltage levels of the first and second power domains.

For some devices however the actual voltage level supplied to an active domain may depend upon usage. As described previously if a device includes a processor with a variable processing frequency, software loading may determine the required processing frequency and hence the voltage required from the appropriate power block of the power management apparatus. Thus the voltage level of a first power domain containing such a processor will vary in use. If a second power domain is constrained to operate at the same voltage level as the first power domain, or with a certain maximum voltage difference, then any variations in the voltage level of the first domain may necessitate changes in the voltage level of the second domain.

The PMIC conventionally controls the voltage level supplied to a power domain by adjusting the output settings of the appropriate power block, i.e. configuration settings of the power block that determine the output of the power block, e.g. the voltage level, current, current limit etc. Therefore, if a first power domain is supplied by a first power block any variation in voltage required for the first power domain involves updating the output settings for the first power block. If a second power domain is supplied by a second power block and is intended to operate at the same voltage level as the first power domain, then the output settings of the second power block are also changed so as to match the voltage output.

Typically however the PMIC has an external serial control interface for receiving instructions for controlling the power blocks. This means that the configuration settings written to power management blocks must be written sequentially, i.e. the control circuitry can address the configuration settings of only one power block at a time. Thus the voltage levels supplied by two power blocks can not necessarily be changed simultaneously. If the PMIC is made aware that the voltage level for the first power block needs to be varied, for instance because usage has changed, it will sequentially receive and write updated output settings to the first power block and then later receive and write updated output settings to the second power block. This leads to a short period where the voltage change has been implemented in the first power block but not the second power block. This can result in a short period where the first and second power domains are operating at different voltage levels or with a difference in voltage levels which could be outside of the permitted range.

To avoid this potential lag it is possible to use an addressing bus arrangement that allows for group addressing of power blocks. In such an arrangement the control circuitry is able to write configuration settings to a group of power blocks and have those updated configuration settings applied simultaneously. This does provide some measure of simultaneous updating but at the cost of using a simultaneous group addressing structure and bus arrangement which adds to the cost and complexity of the apparatus.

Thus in a fourth aspect of the invention there is provided a power management integrated circuit (PMIC) for managing power supply to a device, the PMIC comprising:
  a plurality of power blocks, each power block being adapted to regulate a power supply to a power domain of the device based on output settings for that power block;
  control circuitry for controlling the output settings of said power blocks; and
  translation logic for providing output settings for at least one destination power block based on settings for controlling at least one other power block.

Using translation logic to provide output settings to a destination power block based on settings for controlling at least one other power bock means that any changes to these settings are automatically provided to the destination power block as well as the at least one other power block. In a preferred embodiment the translation logic translated the output setting of at least one source power block to output settings for at least one destination power block. Thus any changes to the settings for the source power block are automatically translated to the destination power block. As used herein the term "source power block" means any power block whose output settings the translation logic is arranged to translate and the term "destination power block" means any power block which receives translated output settings from the translation logic. The source and destination power blocks may be the same or different types of power block. At least one destination block may use the output settings provided by translation logic to determine the power output of that destination power block.

As used previously the term "power block" refers to circuitry of the PMIC which is arranged to supply a controllable voltage and/or current to a load, i.e. a power domain of the device, based on the power supplies available. The settings for the power blocks are typically held in control registers which determine the mode of operation, output and limits of the power block. The term "power block" includes the control registers if present. The skilled person will appreciate that the control registers need not be physically co-located with the voltage regulator or charge pump circuitry on the PMIC and the term "block" should not be taken to mean a single continuous area of the PMIC.

In this embodiment of the invention, when the output settings for a first (source) power block are updated, in order to vary the output of the first power block, these settings can be automatically translated for use by a second (destination) power block. Thus the second power block can use the translated output settings and provide a changed output without requiring the output settings for the second power block to be specifically updated by the control circuitry. A second power domain, powered by the second power block, may therefore be arranged to have a voltage level which follows that of a first power domain, powered by the first power block, without any substantial time lag. Thus a serial control interface can be used by the control circuitry to control the power blocks as is conventional and no parallel interfaces or group addressing schemes are required.

The translation logic may be arranged to simply copy the output settings for the source power block to a destination power block or may be arranged to modify the output settings in a predetermined manner. The translation logic may be arranged to copy the output settings of the source power block in the situation where the source power block and destination power block are substantially similar and it is desired that the destination power block mirrors the power output of the source power block.

In some situations however it may be desired that the voltage level of a destination power block has an offset compared to the voltage level of the source power block. For instance to ensure correct operation of first and second power domains, powered by first and second power blocks respectively, it may be necessary to ensure that the voltage supplied by second power block is never more than 500 mV lower than the voltage supplied by the first power block for example. To conserve power however the voltage supplied by the second power block should be as low as possible. The translation logic may therefore be arranged to translate the output settings for the first (source) power block into output settings for the second (destination) power block which result in an output which is 500 mV lower than that of the first power block.

Also, the PMIC may comprise different types of power blocks. For instance, power blocks may commonly include a voltage regulator adapted to operate in a DC-DC converter mode, as either a step-up (boost) or step-down (buck) converter, or a voltage regulator operable in a Low Dropout Regulator (LDO) mode or a charge pump. Some regulators may be operable in LDO mode or DC-DC mode. The different types of power block may comprise different types of voltage regulator. The different power blocks may additionally or alternatively have different ranges of output, i.e. different voltage and/or current ranges that can be supplied by the power block.

Power blocks may also be arranged to vary the voltage/current level supplied in discrete steps, and hence operate at any of a number of discrete voltage/current levels and different types of power block may have different voltage/current resolutions. That is the number of available voltage/current levels may vary between the different types of power block.

It is therefore possible that output settings for a first power block which would lead to a particular output, e.g. a particular voltage and/or current, might lead to a different output, i.e. different voltage and/or current if applied to a different type of power block. For instance an output setting which indicates the lowest voltage level output would clearly lead to different outputs in power blocks which have different minimum voltage outputs.

Different types of power blocks may also use output settings having different formats. For example the configuration settings for a power block including an LDO regulator may be different from the type of output configuration setting required for a power block including a DC-DC converter and hence the output settings for one power block may not necessarily be appropriate for a different type of power block.

The translation logic may therefore be arranged to modify the output settings of the source power block into a format which is appropriate for the destination power block, for example by changing the value of at least some of the settings to an appropriate level and/or resolution for the destination power block and/or converting the settings into a format which is appropriate for the destination power block.

Conveniently the power management apparatus is configurable so that a destination power block can be selectively arranged to be used as a linked power block, where it uses output settings supplied by the translation logic, or as a stand alone power block wherein the only settings used are those supplied by the control circuitry of the power block. In other words the ability to use translated output settings may be enabled or disabled for a destination power block. This allows the power management apparatus of this embodiment of the invention to be used in any of a variety of devices and the source and destination power blocks linked or not as required. For devices where there is no need for the voltage level of one power domain to track that of another domain the power blocks can be configured so that each is controlled independently by the control circuitry. However in devices where there is a need for a second power domain to track the voltage of a first power domain, the second power domain can be powered by a destination power block and the first power domain powered by a source power block and the relevant translation function enabled.

Configurability may be achieved by selectively activating or deactivating the translation logic applicable for that particular destination power block. For instance a switch or switch arrangement could be used to control whether or not the translation logic provides translated output settings to a destination power block. When the translation logic is deactivated the destination power block would rely purely on the output settings written by the control circuitry for the destination power block.

Alternatively the translation logic may provide the translated output settings to the power block and a separate link setting within the power block may be used to determine whether or not the translated output settings are used or the settings written by the control circuitry.

The translation logic may be arranged to translate the output settings of a source power block to a plurality of destination power blocks. A separate translation logic arrangement may be provided for each destination power block. The translation logic may be arranged to modify the output settings in a fashion suitable for the destination power block. The power management apparatus may also be arranged so that a destination power block receives translated output settings from one or more of a plurality of source power blocks. In some devices the power level of a first power domain may need to be adjusted based on the level of more than one other power domain to which it is interconnected. For example it may be desired that the voltage level of a first power domain never falls below the voltage level of either a second power domain or a third power domain. It may therefore be desirable to track the voltage level of both the second and third power domains and match the voltage of the first power domain to whichever is highest. In other devices it may be acceptable to have an offset between the voltage level of the first power domain and at least one of the second and third power domains and a different offset may be acceptable for different power domains.

The translation logic may therefore be arranged to effectively compare the output settings from two or more source power blocks and determine which settings should be supplied to the destination power block. The translation logic may modify the output settings for each of the source blocks if necessary, for instance to convert to a format suitable for the destination power block and/or to apply any offset applicable between the destination power block and that particular source power block, and then compare the output settings.

Alternatively suitably translated output settings from all the source power blocks could be provided to the destination power block to allow it to decide which output settings to use. This does however require the destination power blocks to have suitable decision making capability and may therefore not be the preferred option.

The output settings may take a variety of forms depending on the type of power blocks used. Conveniently however the output settings comprise one or more digital values that are stored in a memory for the power block. The output settings may comprise register settings and the circuitry of the power block is arranged to provide an appropriately regulated power supply which is determined by the relevant register settings.

The translation logic preferably comprises a relatively simply arrangement of logic which operates very quickly. The skilled person will be aware of various logic arrangements that may be used.

The translation logic may be arranged to bypass the registers of the destination power block that determine the output voltage and ensure that the destination power block uses the settings stored in the relevant registers of the source power block with any necessary modification. For instance the translation logic may comprise a multiplexer arranged with a first input from control registers of the destination power block that control the voltage output and a second input being from the relevant control registers of the source power block (via any necessary logic for modifying the settings stored in the source power block control registers). A select signal determines which input is passed to the output and the output is used by the destination power block control circuitry. Thus if the first input is selected as the output the destination power block acts as a stand alone power block and is only updated when its control registers are updated. If the second input is instead selected as the output the contents of the destination power block registers are not used to determine the output voltage of the destination power block. Instead the contents of the relevant registers of the source power block, with any necessary modification, are used instead. Thus the output voltage of the destination power block is updated when the control registers of the source power block are updated.

In an alternative embodiment the translation logic is arranged to update the contents of the control registers of the destination power block when the control registers of the source power block are updated. In one arrangement a multiplexer is arranged with an output on an addressing line for the control registers of the destination power block, i.e. the output of the multiplexer is used to update the control registers of the destination power block. A first input is arranged to receive register update instructions sent from the control circuitry for the destination power block and a second input is arranged to receive register update instructions sent from the control circuitry for the source power block, via any necessary modification logic. A select signal determines which input is passed to the output and the output updates the destination power block control registers. Thus if the first input is selected as the output the destination power block acts as a stand alone power block and is only updated when a command to update its control registers is received. If the second input is instead selected as the output, when a command is sent to the source power block to update its registers an appropriately modified command is also used to update the contents of the relevant registers of the destination power block. Thus the output voltage of the destination power block is updated at the same time that the control registers of the source power block are updated.

The translation logic may implement a look up table to provide any necessary modification of the settings for the source power block to a format suitable for the destination power block and/or to provide a desired voltage offset to the outputs of the source and destination power blocks. The skilled person would be well aware how to implement a simple look up table.

As mentioned the translation logic may be arranged to translate the output settings of a source power block to a destination power block. In other words the contents of the control registers of the source power block, or an addressing signal for updating the control registers of the source power block, is translated to provide output settings for the destination power block. In general however this aspect of the invention relates to two or more power blocks using a common set of control settings such that an instruction to update one power block will automatically update each power block. Translation logic translates the common set of settings to the individual power blocks and can modify the settings as required for each power block. In one embodiment therefore the translation logic translates settings in a common store, for instance a control register, to two or more destination power blocks. The common store, e.g. control register, could be separate from a power block and updated by the PMIC control circuitry. Translation logic may then be arranged to translate the settings in the common register to first and second destination power blocks.

As mentioned above by making the PMIC configurable so that a destination power block can be selectively coupled to use the translated settings of a source power block or not, the same PMIC can be used with a variety of different devices with advantages in terms of cost, development, testing etc. Thus according to a fifth aspect of the invention there is provided a power management integrated circuit for managing power supply to a device, the apparatus comprising:

a plurality of power blocks, each power block being adapted to regulate a power supply to a power domain of the device based on the output settings for that power block; and control circuitry for controlling the output settings of said power blocks;

wherein at least a first block is configurable to operate in one of:

a stand-alone mode wherein the output of the first power block is based on output settings provided by the control circuitry; or a coupled mode wherein the output of the first power block is based on output settings translated from the output settings of a second power block.

This aspect of the invention thus provides a PMIC which may be configured to use translated output settings or not. All of the various embodiments and arrangements described above with reference to the fourth aspect of the invention are applicable to this aspect of the invention. In particular the PMIC may comprise translation logic for translating the output settings for the second power block to the first power block. The translation may include modifying the translated output settings to introduce a desired offset into the power levels of the first and second power blocks and/or to convert the output settings into an appropriate format and/or resolution. There may be more than one power block which is configurable to operate in a stand-alone or coupled mode and there may be a plurality of power blocks which may receive translated output settings from a source power block.

It should be noted that the PMIC of the fourth or fifth aspect of the invention may also comprise a PMIC according to the first or second aspects of the invention. The PMIC may therefore be operable, in use, to provide a plurality of power states, and configured to transition from a current power state to another power state in response to a power state transition command, wherein the apparatus is either arranged to provide a predetermined delay, or configurable so that a predetermined delay can be applied, between receipt of a power state transition command and start of the appropriate power state transition.

The invention also relates to methods of controlling a PMIC. In a sixth aspect of the invention there is provided a method of controlling a power management integrated circuit having a plurality of power blocks for providing power to power domains of a device, the output of each power block being based on its output settings, the method comprising the steps of:

writing updated output settings to a source power block to vary the output of the source power block as required;

translating the output settings of the source power block to a destination power block; and using the translated output settings as the output settings for the destination power block.

The method of the present invention thus varies the output of the source power block by writing updated output settings to the source power block as is conventional. The output settings of the source power block are translated to the destination power block and used by the destination power block as its output settings. Thus a variation in the output of the source power block will automatically lead to a similar variation in output of the destination power block. All of the embodiments and variants described above with respect to the fourth and fifth aspects of the invention apply to the method of the sixth aspect of the invention. In particular the step of translating the output settings may comprise modifying the output settings to provide a predetermined offset into the output of the source and destination power blocks and/or to convert the output settings into a format and/or resolution appropriate for the destination power block.

As mentioned previously the ability to provide sequencing control signals from a PMIC to external power blocks allows greater flexibility in use of a single design of PMIC as external power blocks can be used to power device sub-systems that need to be started in a particular order in relation to the other device sub-systems. Thus in a seventh aspect of the invention there is provided a power management apparatus for managing power supply to a device and operable to provide a plurality of power states, the apparatus comprising:

a plurality of power blocks, each power block being adapted to regulate power supply to a power domain of a device;

sequencing control circuitry for activating or deactivating the power blocks in a specified sequence in a transition from one power state to a different power state; and at least one sequencing control output interface;

wherein the sequencing control circuitry is configurable to provide at least one external sequencing control signal to at least one sequencing control output interface.

The various embodiments of power management apparatus and the methods described above may be used in a variety of electrical devices. The power management apparatus is particularly suitable for portable electrical devices. All aspects of the invention may be used in computing devices such as laptops, notebooks, PDAs and the like. All aspects of the invention may be used in media players such as MP3 or other media players or video players or portable television devices. All aspects of the invention may be used in communication devices such as mobile telephones or mobile email devices. All aspects of the invention may also be used for GPS devices or navigation devices or any other portable electronic device.

BRIEF DESCRIPTION OF THE DRAWINGS

The invention will now be described by way of example only with reference to the following drawings, of which.

DETAILED DESCRIPTION

Figure 1:
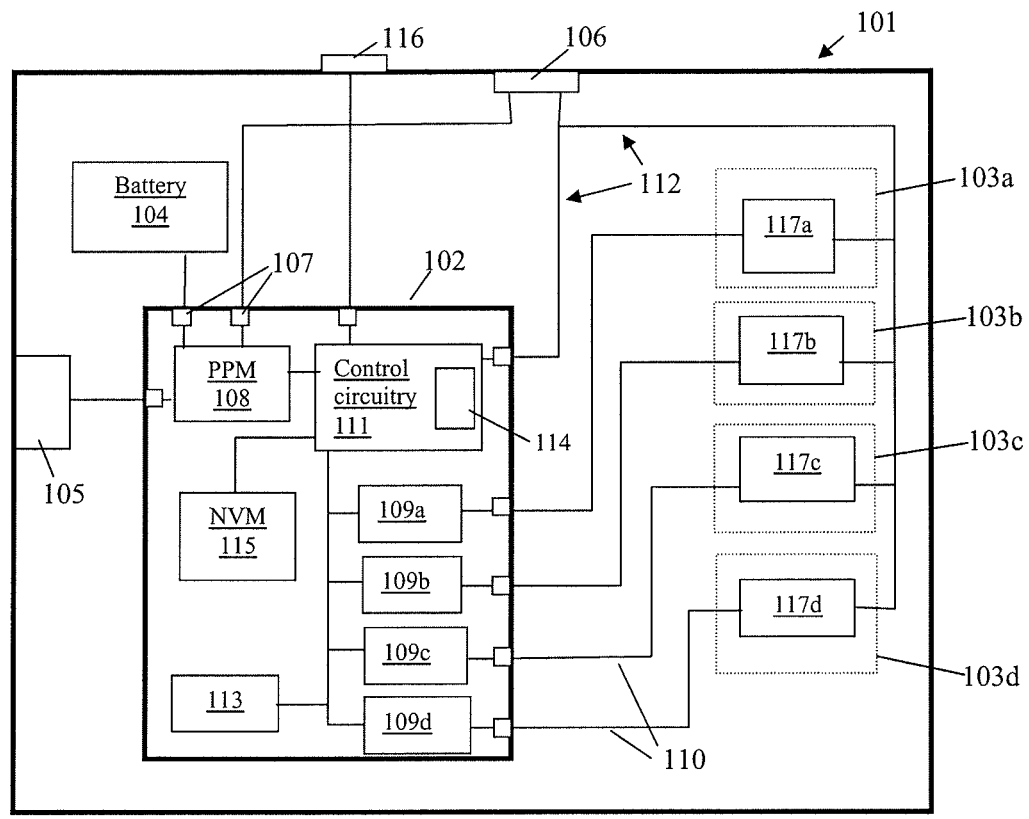
FIG. 1 illustrates a typical power management unit of a portable device.

FIG. 1 illustrates the general principles of the power supply and power management in a device, generally indicated 101, which may, for instance, be a portable device. The device 101 includes a power management integrated circuit (PMIC) 102 for managing power supply to the device. The PMIC receives power from various possible power sources and regulates the power supply to the various power domains 103a-d of the device. In this example the device has three possible power sources. There is an internal battery 104 for supplying power when other power sources are not available. The device also has a bulk power interface 105 adapted to receive bulk power, i.e. an interface that is designed to operate with equipment allowing the device 101 to be plugged into a socket delivering mains electricity, e.g. a wall socket in the home. For portable devices the bulk interface is typically designed to interface with an external adapter that plugs into the bulk supply and converts the AC supply to a suitable DC supply. Having an external adaptor reduces the size and weight of the device itself. However the bulk interface could receive an AC mains supply and the device could include a mains adapter if necessary. The device also has a device-to-device interface 106, such as a USB interface, that is designed to interface with a connector for linking devices together in a manner that allows a power supply. USB connectors are well known for connecting devices together to allow for data transfer and also power supply from a host to a device but other types of interface could also be used. Other devices may of course have different arrangements of possible power sources and some devices may have an additional backup charge store, such as a battery or large capacitor to provide power for a certain period of time if the main internal battery is removed or completely discharged.

The internal battery, the bulk interface and the device-to-device interface are connected, via suitable pins 107 on the PMIC, to power path management circuitry 108 of the PMIC. The power path management circuitry switches between power sources depending on the available power supplies. The power path management circuitry may also provide power to a battery charger (which may or may not be integrated within the PMIC) for charging the internal battery.

In operation the power path management circuitry 108 of the PMIC 102 selects the appropriate power source from those available. The PMIC also acts to regulate the power supply to provide the necessary power for the device power domains. As mentioned above the device has various power domains 103a-d. Each of these power domains 103a-d represents a domain comprising one or more sub-systems of the device which receives its own power supply from the PMIC. Four power domains are shown in FIG. 1 for ease but the skilled person will appreciate that some devices may have many more power domains. As a simple, non-limiting example power domain 103a may contain a processor core 117a. Power domain 103c may contain a volatile memory 117c and power domain 103b may comprise an I/O subsystem 117b for data transfer between the processor and the memory and other system components. Power domain 103d may comprise a Real Time Clock circuit 117d for maintaining a count used for the date and time. Each of the power domains may have different power requirements in operation.

The PMIC therefore comprises a plurality of power blocks 109a-d and the power outputs of the power blocks 109a-d are connected, via appropriate power lines 110, to the appropriate power domains 103a-d. The power blocks comprise regulators for regulating the power supplied by the power block. Such regulators may typically be DC-DC Buck (step-down) converters, DC-DC Boost (step-up) convertors, Low Drop Out (LDO) regulators or Charge-Pump type regulators. Some power blocks have regulators operable in more than one mode, e.g. a regulator may be arranged to be operable as either an LDO or a DC-DC regulator. The power blocks may typically be configurable to provide a range of possible outputs. Typically a PMIC will have a plurality of power blocks comprising regulators of different type and/or output range to cater for the different power requirements of the device sub-systems. For example the CPU core 117a within power domain 103a may require a relatively large maximum current and hence a DC-DC Buck convertor may be suitable for power block 109a, for example with an output range of about 0.5V to about 2.0V with a maximum current of about 1 A. Were the device to have a display with a backlight, the backlight may require a larger voltage and so a DC-DC Boost converter may be used to give a voltage output in the range of 5V-20V say. Other device sub-systems may only need low maximum currents and an LDO may be used. The Real Time Clock 103d of the device may need a very low current and hence power supply to such a device may be provided by power block 109d using an LDO with a maximum current of around 10 or 20 mA or so.

The output of the regulators is determined by the output configuration settings of the circuitry associated with the regulator. Together the regulators and associated circuitry form the power blocks.

The power blocks are controlled by the control circuitry of the PMIC 111. The control circuitry 111 determines which power blocks are active in the PMIC and also the output of the active power blocks. Some power domains, when active, may require a fixed voltage supply but for others the voltage requirements may vary with usage of the device. The control circuitry may therefore be arranged to receive, via command and control signal lines 112, information regarding the power requirements of the power domains 103a-d from one or more of the various device sub-systems 117a-d and to control the outputs of power blocks 109a-d accordingly. The control signal lines 112 could comprise a serial communication bus or a number of hardware signal lines. The control signal lines may also be used to communicate control information back to the power domains. As illustrated some control signal information may also be received via the device-to-device interface 106.

The power control circuitry 111 comprises a memory such as one or more registers 114 for maintaining settings for operation of the PMIC and these settings may be updated by the processor for example by writing new settings to the PMIC control circuitry registers via the command and control lines 112.

The power path management circuitry and control circuitry clearly will also require power and so the PMIC will typically also have at least one power block 113 for providing internal power to the PMIC.

Typically a PMIC is arranged to provide a plurality of different power states wherein different rules govern the power supplied to the power domains in the different power states. For example the PMIC may have an ON power state where all power domains 103a-d may be active and powered according to usage, i.e. the rules implemented by the control circuitry are defined such that each power domain is supplied with the power it needs. This may mean that power is always supplied to a particular domain in the ON state or may mean that power is only supplied to that domain when a corresponding device sub-system is required.

The PMIC may also provide an OFF state where the majority of the power domains are unpowered. In some devices however there may be a need to maintain some power even when the device is off. For instance devices that maintain an internal date and/or time are provided with a Real Time Clock and, to avoid the requirement to re-enter the time every time the device is switched on, power is maintained to the Real Time clock even when all other device sub-systems are off. The power domain or domains that are always on, whatever the power state, provided there is at least some power available, are often referred to as Alive power domains. In the simple example described above power domain 103d, comprising a Real Time Clock 117d, is therefore an Alive power domain. Note as shown in FIG. 1 the Alive power domain 103d containing the Real Time Clock is external to the PMIC. In some embodiments the PMIC itself may comprise a Real Time Clock. The PMIC itself however typically remains powered in the OFF power state, i.e. power block 113 maintains power to the PMIC in the OFF state.

The device may also have a PMIC SLEEP state to support a device operational mode where the device has different functionality. In the SLEEP state some device power domains may be inactive with no, or minimal, power being supplied whilst other, non Alive, power domains are still active. For instance it is common in some devices that in a transition from the ON state to the SLEEP state the state of the system just prior to leaving the ON state is stored in memory. Thus, in the example described above, the processor power domain 103a and I/O sub-system power domain 103b may be unpowered in the SLEEP state but sufficient voltage may be supplied to memory 103c to maintain the state of the memory.

In each of the ON, SLEEP and OFF power states the PMIC itself may typically be fully operational, i.e. the PMIC control circuitry is powered by power block 113 although in some applications the PMIC may be arranged so that power block 113 can be switched off in the OFF state and thus the control circuitry is largely unpowered. In any case, in some instances the power supply to the PMIC may cease due to a lack of suitable power supply. For instance if no external power supply is connected and the internal battery 104 is completely exhausted or removed the PMIC will enter a NO-POWER state. It will be appreciated that when the power is removed from the control circuitry the settings in the registers 114 will be lost. The PMIC control circuitry is therefore arranged with a non-volatile memory (NVM) 115 (e.g. ROM or OTP or MTP (multi-time programmable, e.g. Flash memory) or metal or polysilicon fuses) which stores the default or boot settings for the PMIC. As soon as the control circuitry is powered, for instance when a charged battery is inserted or an external power supply is connected, it may access the NVM to determine the boot settings for the PMIC. Note that FIG. 1 shows the NVM 115 as part of the PMIC and typically PMICs do include an NVM for storing the default boot configuration settings needed for start up (sometimes referred to as bootstrapping). However some devices may be arranged with a PMIC adapted to access an NVM which is external to the PMIC.

It will be noted that some PMICs may provide additional power states. For instance there may be different types of ON state offering different levels of functionality or different types of SLEEP state, or STAND-BY or HIBERNATE states to support various device operating states. The skilled person will appreciate that the device may have other power states that are not generally noticeable to the user but which relate to various device states. For instance there may be a BACK-UP power state which is reached if the main internal battery is removed or completely discharged. In the BACK-UP state an additional charge store, such as a secondary battery may be arranged to keep an Alive power domain powered but power block 113 may not power the PMIC. Thus the PMIC register settings may be lost in the BACK-UP power state as well. There may also be a PROGRAM power state which is used to program various aspects of the device or the PMIC, for instance for programming configuration settings in the NVM 115. As mentioned there will also be a NO-POWER state which applies when there is no power available at all and all device functions are unpowered. For ease however the explanation will focus on the most common power states and the common power state transitions.

In operation a transition from one PMIC power state to another can be initiated in a number of different ways. The device may have a central power control switch 116 which can be operated by the user to trigger a power state transition. The power state transition may depend on the current state so that a PMIC in the ON state will transition to either the OFF or SLEEP state on operation of the central power control whereas a PMIC in the OFF or SLEEP states will transition to the ON state. It will be appreciated that the PMIC must be able to detect operation of the central power control even in the OFF state. If the PMIC control circuitry remains powered in the OFF state then such detection is straightforward. However if the PMIC is configured such that the control circuitry is not powered in the OFF state then separate monitoring circuitry may be provided, which remains powered in the OFF state or the arrangement of the central control switch may be such that its operation provides a power supply to enable the PMIC.

A command for the PMIC to transition from the ON state to a SLEEP or OFF state may also be generated within one of the power domains 103a-d of the device. For instance the processor 117a may initiate a transition in response to a user command generated by some other user interface or after a certain period of user inactivity. A command to transition from the OFF state to the ON state could be generated by a Wake Up Timer in the Alive power domain which is responsive to the Real Time Clock circuit 117d.

Connecting another device via the device-to-device interface 106 may generate a command for a PMIC in the SLEEP or OFF states to transition to the ON state or a signal may be received from the other device via the device-to-device interface instructing the PMIC to initiate a transition.

If the device has a data communication interface, such as an RF module for wireless communications, receipt of a data signal via that interface whilst the device is in a SLEEP state may lead the communication interface to generate a power state transition command to transition to the ON state.

The PMIC itself may also generate a power state transition command. For example a battery monitor may be arranged as part of the power path management circuitry to monitor the voltage level of the battery. If the battery voltage level drops below a certain threshold the PMIC may initiate a transition to the OFF state.

However the power state transition command is generated it is communicated to the PMIC to act upon.

Depending on the power state transition required it may be desirable to activate and deactivate the power domains in a certain sequence. At least some of the power domains of the device may be connected to one another, possible via level shifting circuitry if the domains operate at different voltages. To avoid problems with analogue latch-up or back-powering of domains or the like the domains are designed to be started or stopped in a predetermined order.

Typically the PMIC therefore includes, or is connected to, a sequencer for activating the power blocks in a specified sequence. The sequencer activates or deactivates the power blocks in a prescribed sequence based on the association with virtual time slots. The sequencer has a timing reference which allows time slots to be spaced in time by a nominal minimum time figure, although the length of the time slots may be determined by other means as well, for example based on a particular status signal. The time slots may typically be of the order of 1 ms apart.

Figure 2:
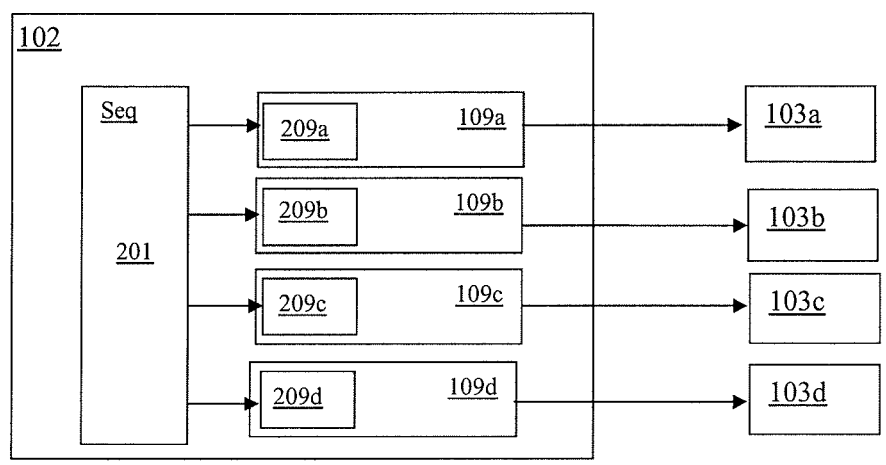
FIG. 2 illustrates a power management device having a sequencer for controlling power blocks in a specified sequence.

FIG. 2 illustrates how a sequencer 201 may be arranged to control the power blocks 109a-d illustrated in FIG. 1. The sequencer may be part of the PMIC control circuitry 111 and controls the power blocks by updating the output configuration settings 209a-d in the predetermined sequence which is appropriate for that power transition.

Figure 3:
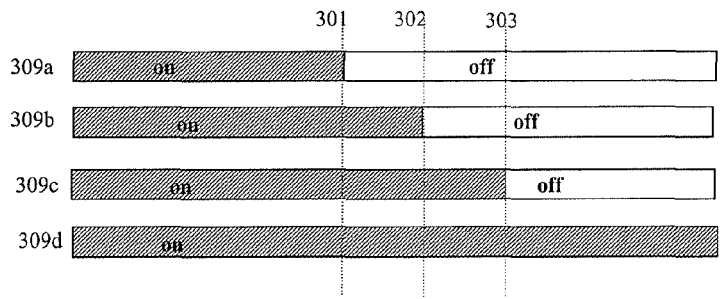
FIG. 3 illustrates a possible power state transition sequence.

For example an ON to SLEEP transition may involve switching power block 109a off in one time slot and switching power block 109b off in a subsequent time slot. This ensures that power supply to power domain 103a is stopped before the power domain 109b is depowered, i.e. before power supply is stopped. A SLEEP to OFF transition could involve power block 109c being switched off in one time slot at the same time as power block 109d is configured to provide the power needed for the Alive power domain in the OFF state. An ON to OFF power state transition could simply comprise the ON to SLEEP transition followed by the SLEEP to OFF transition. FIG. 3 illustrates an ON to OFF transition. Bars 309a-d represent the power state of power blocks 109a-d respectively and the time slots are represented by lines 301, 302 and 303.

It will be appreciated that in an OFF transition, after all the power blocks (which are not Alive power blocks), have been switched off, the power block supplying power to the PMIC control circuitry, i.e. power block 113, may also be turned off. In this case, a transition from the OFF state to an ON or SLEEP state may start with a trigger signal to activate the PMIC power block and then start the relevant power state transition. Typically however the PMIC power block 113 remains enabled in the OFF power state.

An OFF to ON transition would usually be the reverse, i.e. power blocks 103c would be switched on in the first time slot (together with any necessary adjustment of the power level of the Alive power domains), followed by power blocks 103b and then 103a in order.

The sequencer may control the power blocks by updating the configuration settings via the serial control interface on the PMIC for communicating with the power blocks and/or the enable/disable signals could be provided on dedicated enable/disable signal lines.

The sequence in which the power blocks are controlled is stored in the NVM 115 and, when the PMIC control circuitry is powered, also in the registers 114. The allowable power transitions may also be stored in the NVM and may be configurable by suitable programming of the NVM. Not all possible power state transitions may be allowable. For example the PMIC may be configured such that it may not be allowable to transition from the OFF power state to the SLEEP power state. In such an example it may be possible to transition from the ON state to either the SLEEP or OFF states, and from the SLEEP state to either the OFF or ON states but from the OFF state the only allowable transition may be to the ON state.

It will be clear from the foregoing that for a device in the ON state a command to transition to the SLEEP or OFF states may be generated in a variety of ways and it may be generated by circuitry external to the processor 117a of the device, i.e. the system host processor. At the time the power state transition command is generated the device processor could be running several layers of processing. These layers of processing could include an operating system and various layers of control down to various drivers. When changing the power state at least some of these processes should be terminated in a controlled manner. Failure to correctly terminate the processes could cause instability or corruption of one or more of the device sub-systems if not terminated correctly. For example the processor may be performing a critical function, such as writing to some form of flash memory, which needs to be terminated correctly before the power supplies involved are removed to avoid corruption of the flash memory.

Figure 4A:
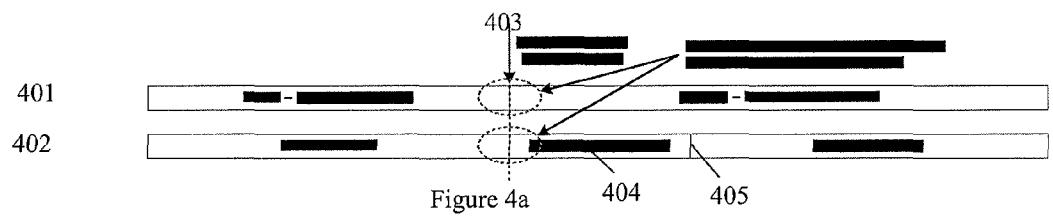
FIG. 4a illustrates a conventional power state transition.

In the example described above however the transition from the ON state to the SLEEP or OFF states starts with the power supply to the processor being terminated. Thus on receipt of a command to transition from the ON state to either the SLEEP or OFF states the PMIC control circuitry will initiate the appropriate power transition and switch power block 103a off followed by power block 103b. This is illustrated in FIG. 4a which illustrates the system operating state 401 and PMIC power state 402 against time. Initially the PMIC is in an ON power state and the device operating state is consequently active with various processes running. If a SLEEP power state change request is then received at time 403 the PMIC control circuitry starts the power transition sequence 404. At time 405 when the power state transition is completed the PMIC power state is the SLEEP power state. However the power to the processor is removed at the start of the power transition sequence, i.e. at time 403. Thus at this time the system (in this example the processor) is forced into a standby operating state and any running processes are forcibly terminated by power removal. This can potentially lead to data corruption and system instability. Alternatively the control circuitry of the PMIC may be arranged to assert a reset signal just prior to removing power which similarly forcibly terminates the active processes.

Figure 4B:
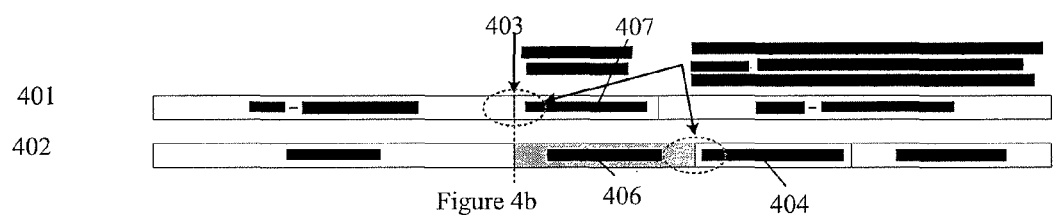
FIG. 4b illustrates applying a delay prior to a power state transition in accordance with an embodiment of the present invention.

In one embodiment of the present invention the PMIC is arranged to introduce a delay between receipt of a power state transition command and start of the appropriate power transition sequence. The delay, which may be configurable, is set to have a duration which is sufficiently long to allow for any shut-down actions to be performed, such as storing the state of the system in memory and for all running processes to be correctly terminated. Referring to FIG. 4b, in this embodiment of the present invention receipt of a power state transition command at time 403 results in a delay 406 being applied prior to the start of the power transition sequence 404. During this delay period 406 any necessary shut down actions can be performed and processes running in the system can be terminated safely during a termination phase 407 prior to start of the power transition sequence. It will be appreciated that the delay is applied prior to the start of the power transition sequence 404. The power state transition sequence, is then performed as normal after the applied delay.

The use of a delay thus reduces the risk of system corruption or instability and avoids the need for complicated handshaking arrangements between the PMIC control circuitry and the processor.

Figure 5:
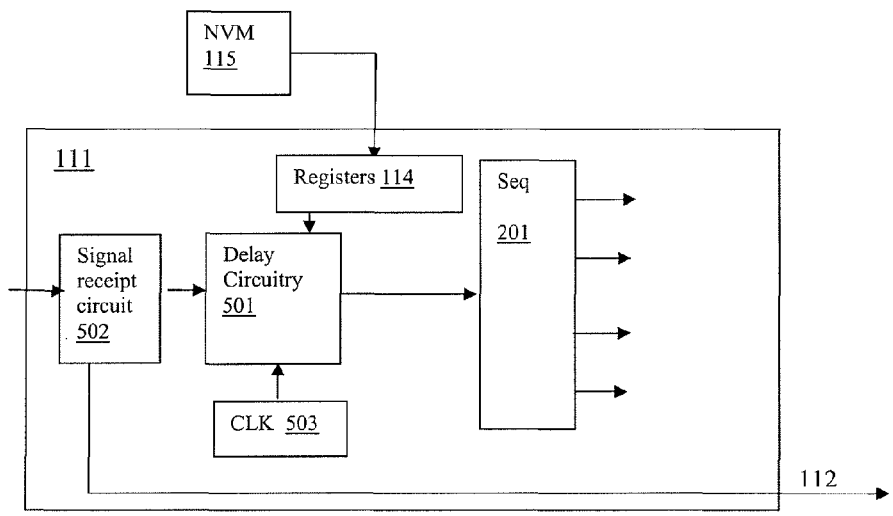
FIG. 5 illustrates one embodiment of a power management apparatus for applying a delay prior to a power state transition.

FIG. 5 shows one embodiment of the control circuitry 111 of the PMIC having circuitry 501 for implementing a delay. Circuitry 502 is arranged to receive any power state transition command, wherever generated, including by the PMIC itself. On receipt of a power state transition command a suitable control signal is sent to delay circuitry 501. At the same time at least one control signal indicating a power state transition is sent, via a non-delayed path, to the command and control lines 112. This signal is provided to the power domains so that the processor, for instance is aware that a power state transition command, which may not have been generated by the processor, has been received. The processor may be programmed so as not to initiate any critical operations while a power state transition is signalled and to start to terminate active processes.

The delay circuitry 501, on receipt of the control signal, applies a suitable delay before activating the sequencer 201 to activate/deactivate the power blocks as described previously. The delay circuitry may use any suitable circuitry to achieve the delay but conveniently the delay may be imposed by counting a certain number of clock cycles before activating the sequencer 201. The delay circuitry may therefore be arranged to receive a clock signal. The clock signal may be received from a circuit external to the PMIC or may be received from a suitable clock signal generator 503 on the PMIC.

The duration of the delay may be fixed but in the preferred embodiment is configurable. In the embodiment shown in FIG. 5 the amount of the delay is determined by a value set in registers 114 of the control circuitry. The range of possible values for the delay setting that are storable in memory determines the range of possible delays. A default or boot value for the delay may be stored in NVM 115 and written to the appropriate registers on initialisation of the PMIC. Thus a device manufacturer can decide on an appropriate delay for the particular device and program the NVM accordingly.

The duration of the delay, as mentioned, is preferably chosen to allow sufficient time for the device operating system to terminate all processes prior to the power state transition. The duration of the delay may be fixed for a particular PMIC once the NVM has been programmed. However in some embodiments the duration of the delay may also be configurable in operation. The relevant delay setting stored in the NVM will set the default or boot delay duration but this may be altered in operation by changing the delay setting in registers 114. This can allow the delay to be changed, if necessary, to account for actual device usage.

For example the processor, when starting a new process or application may be arranged to instruct the PMIC to update the required delay as necessary to reflect the likely time take to terminate all the processes should a power state transition command be generated and/or a degree of importance of the process. For instance a processor which is not running any user initiated applications may be able to safely terminate all processes in a relatively short period of time and a delay period of 10 ms or so may be sufficient and this may be the delay settings held in the registers 114. If the processor is running several applications however there may be a number of processes to terminate correctly if a power state transition command is generated. In this instance, the processor may communicate with the PMIC to set a longer delay value, for instance a duration of 50 or 100 ms or so. If a process is then initiated which involves writing data to flash memory or the like, the delay period may be increased again as the data writing process may take longer to terminate correctly and the risk of corruption if the power is removed from the processor or the memory too soon may be relatively high. When the processor thus starts writing the data to memory it may communicate with the PMIC to set a longer delay period, for example in the order of 500 ms or 1 s or the like. Once the data writing process is safely finished the delay period may be reduced again. It will be appreciated of course that the delay values given above are for the purpose of example only and are not meant to limit the invention. Other delay periods may be chosen depending on device usage and the range of delay settings which can be specified.

In one embodiment the delay may be configured, by setting a suitable value into registers 114 or NVM 115, to no delay, i.e. a delay duration of zero.

Although the description so far has focussed on the PMIC implemented in a device as shown in FIG. 1 the skilled person will appreciate that the PMIC may well be manufactured and supplied separately from the other components of the device and assembled by a device producer who is different to the PMIC manufacturer. Conventionally a PMIC has generally been designed for a specific device with the number and type of power blocks designed specifically for the number and type of power domains in the specific device.

In one embodiment of the invention however the PMIC is arranged so that it can be used in a number of different devices having different power requirements. To allow for the same design of PMIC to be used in several different devices the features of the PMIC may be configurable by the device producer to suit the particular device it is used with. Therefore the delay may be configurable between a range of possible delays. The delay may be configurable by programming an appropriate setting in NVM. This range may include no delay for devices where system instability due to forced termination of processes is not an issue. The range of delays may include delay durations in the order of a few ms, a few tens of ms, a few hundreds of ms or delays of a second or longer.

It will be appreciated that for any PMIC the processing of a power transition command to identify the appropriate power transition sequence and activate the sequencer will take a finite amount of time. In other words there will be a short inherent period of time between the time at which the power command transition command is received at the PMIC and the sequencer issuing command to the power blocks. It will be appreciated however that the delay contemplated herein is a deliberate additional delay over and above necessary processing time which is engineered into the PMIC. As mentioned above this deliberate delay will typically have a duration of at least 1 ms and may be of the order of tens or hundreds of ms or longer.

In some embodiments a different delay may be applied to different power state transitions. For instance a transition from OFF to ON power states may not require any delay and different delay could be applied to a transition from the ON to the SLEEP state as compared to a transition from the ON to the OFF state. Where the PMIC has multiple different SLEEP or ON states different transitions may need different time to perform any necessary transition activities/terminate any effected active processes. However for ease of implementation the same delay may be applied to any power state transition. Such delay is therefore chosen to have a duration which is sufficient for all transitions. The delay does therefore result in a slight unnecessary delay being applied to some power state transitions—however applying a single delay to all transitions is easy and inexpensive to implement and results in a device with a much reduced risk of instability arising from power state transitions.

It should be noted that the delay is only applied prior to a power state transition command. Changes in power level that occur in operation in any given state, for instance due to device usage, occur without any delay being applied.

Such power changes occur due to changes in the usage of the various device sub-systems. For example the voltage required by a processor is usually related to the actual clocking frequency of the processor. A processor operating at 600 MHz may need a voltage supply of 1.4V say whereas the same processor operating at 100 MHz may require only 1.0V and has a significantly decreased power consumption. To conserve power, especially in portable devices, the processor may therefore be arranged to operate at a reduced processing frequency, and hence reduced voltage, whenever possible. Thus the processor may be arranged to vary its operating frequency in line with the processing load. For example a device with audio visual output capability may operate at a relatively high frequency when processing both audio and video. However if the device is operated to output audio alone the processing frequency may be reduced.

In operation therefore the device processor may be arranged to communicate its current power needs to the PMIC control circuitry 111 via the control and command signal lines 112. The PMIC control circuitry is arranged to control power block 103a to provide an appropriate power output for the processor power domain 109a. If the processing load changes to such an extent that the processor needs to increase, or can decrease, its processing frequency, it communicates with the PMIC control circuitry to ensure that the power supplied by power block 103a changes accordingly.

Other device sub-systems may also have power requirements that depend on usage and may be arranged to communicate their power requirements to the PMIC control circuitry, either directly or, typically, via the processor. For example if one power domain comprises an audio codec with speaker driver, a low supply (say 2.1V) may suffice at normal volume settings. At very high volume settings a higher voltage of say 5V may be required. Power can be saved by operating at the lower voltage when volume setting is at most positions. This change in supply could be communicated to the PMIC, where the respective power block could be set to the appropriate power setting. The operating mode of the power block could also be changed to save power, for instance a power block which has a voltage regulator operating as a DC-DC type regulator may be switched to operate in LDO mode when a lower load current is required to save switching power associated with switching regulator in DC-DC mode.

Some of the system functions of the device implemented in the different power domains are arranged for internal interconnection to allow inter-communication between the various system functions. For example the Alive power domain 103d including the Real Time Clock circuit 117d may be arranged for communication with the processor power domain 103a. In some instances restrictions may be placed on the voltages, or the maximum voltage difference, between two power domains. For example the Alive power domain may need to be operated at a voltage which is substantially the same as that of the processor power domain to avoid damage or corruption of the system.

Clearly this means that the voltage supplied to the Alive power domain should match (within a certain limit) that supplied to the processor power domain.

The PMIC control circuitry 111 may therefore be arranged so that in the ON power state the voltage output of power block 109d matches the voltage output of power block 109a. Thus changes in the voltage output of power block 109a, due to a variation in usage of the processor, also lead to a variation in the voltage output of power block 109d.

Figure 6A:
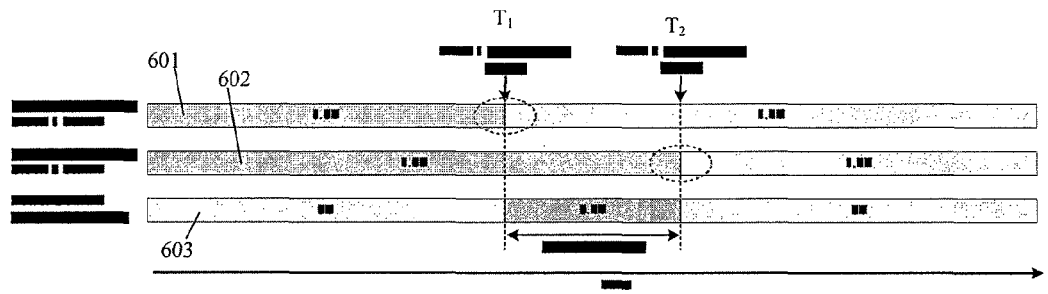
FIG. 6a illustrates a conventional process for updating the configuration settings of power blocks.

Typically however the control circuitry of the PMIC uses a serial control interface to update the configuration settings of the power blocks. Thus changes to the configurations settings of different power blocks may only be made sequentially. This results in a short period of time where there may be a voltage imbalance between the voltage outputs of power blocks 109a and 109d as illustrated in FIG. 6a. FIG. 6a shows the voltage output 601 of power block 109a, the voltage output 602 of power block 109d and the voltage difference between power domains 103a and 103d. Initially both power block 109a and 109d are outputting 1.0V and thus there is no voltage difference between the relevant power domains. After a while the processing load increases and so the processor indicates to the PMIC that it needs to increase its processing frequency and thus requires an increased voltage. The PMIC control circuitry therefore update the configuration settings of power block 109a at time $T_1$ and its voltage output increases to 1.4V. The PMIC control circuitry is adapted to also alter the voltage output of power block 109d but can't address both power blocks at the same time. Thus the configuration settings for power block 109d are updated in a subsequent addressing period at time $T_2$. After $T_2$ both power blocks are outputting 1.4V and there is no voltage difference between the power domains. However for the short period between $T_1$ and $T_2$ there is a voltage difference of 0.4V between the two power domains. This could corrupt logic levels and timing between circuitry in respective domains. For analogue, it could cause an output voltage swing from one domain to exceed the supply voltage of another domain and at least give signal clipping, possibly even cause latch-up due to parasitic diodes turning on.

Figure 7:
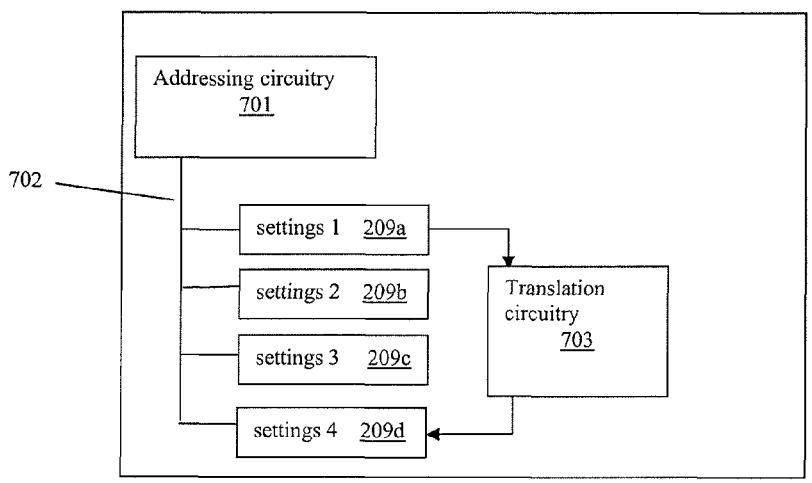
FIG. 7 illustrates a power management device having translation circuitry according an embodiment of the invention.

In one embodiment of the invention therefore translation circuitry is used to link the output configuration settings of the power block 109d to power block 109a as shown in FIG. 7. FIG. 7 illustrates that part of the PMIC control circuitry 111 comprises circuitry 701 for updating the configuration settings 209a-d for the power block via a serial control interface 702. In this embodiment of the invention however translation circuitry 703 is arranged to translate configuration settings 209a of the power block 109d to the configuration settings 209d of the power block 209d.

The translation logic is arranged to translate the configuration settings that govern the voltage output of power block 109a to settings that provide the same output in power block 109d. The skilled person will be aware that the power block settings may be stored in registers dedicated to the power block and defined parts of these registers are used to determine the voltage output. The translation logic may therefore translate the values from the relevant part of the registers for power block 109a into suitable values for power block 109d. The translated settings may be just the voltage output settings or other relevant settings, such as current limits and the like may be translated as well. These translated settings may then be used to govern the output of power block 109d instead of the previous settings.

Figure 6B:
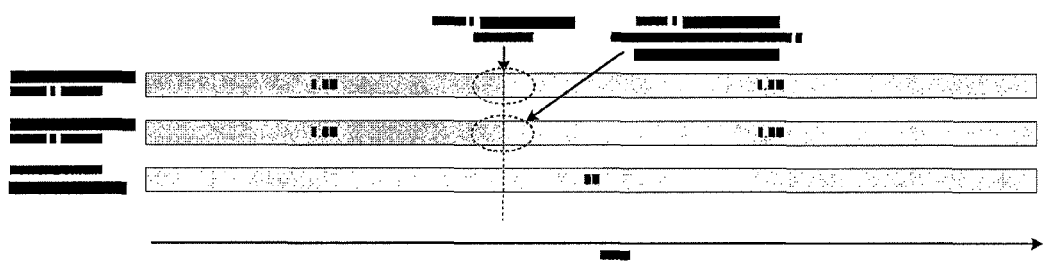
FIG. 6b illustrates an updating processes where the configuration settings of two power blocks are coupled according to an embodiment of the present invention.

The translation logic is preferably a relatively simple logic arrangement that has a very quick response time to updating of the configuration settings 209a of power block 209d. Thus when the output voltage configuration settings 209a are updated by the addressing circuitry 701, the updated values are automatically, and virtually instantaneously, translated to power block 109d. This means that there is substantially no delay between changing the output voltage of power block 109a and the output voltage of power block 109d, as illustrated in FIG. 6b. Again both power blocks are initially outputting 1.0V. In response to a request from the processor, the PMIC control circuitry updates the configuration settings of power block 109a at time $T_1$ to increase the voltage supply to 1.4V. Power block 109d is coupled to the configuration settings of power block 109a by the translation logic and thus, when the configuration settings of power block 109a are updated these updated settings are automatically translated to power block 109d. Power block 109d uses these translated settings and hence the changes to the settings of power block 109a also result in a change in output voltage of power block 109d at time $T_1$. Thus both outputs change at substantially the same time and the voltage difference between the power domains remains zero throughout. If necessary, to mitigate for effects due to different power block output rise times, voltage changes can be implemented by stepping the output voltage in very small steps over an amount of time, e.g. 12.5 mV every 1 us.

The arrangement of the translation logic depends on the format of the relevant configuration settings for power block

109a, i.e. the source power block, and the format for the relevant configuration settings of power block 109d. It also depends on the relative voltage ranges of the two power blocks and the desired relationship between the power outputs of the two power blocks.

As mentioned above the configuration settings may be stored in suitable registers. The digital value in the relevant part of the register thus sets the voltage output level. If the two power blocks are arranged such that the same register entry would lead to the same voltage output in each power block the translation logic simply needs to provide the destination power block with the values of the relevant register entries from the source power block.

However power block 109a, having a DC-DC convertor, may have a different voltage output resolution to power block 109d, having an LDO and consequently the output voltage configuration settings for power block 109a may consist of a different number of bits to those of power block 109d. For instance the source power block may use six bits to determine the voltage level whereas the destination power block uses only four bits. If the overall voltage range of the two power blocks is the same, the four most significant bits of the settings for the source power block could be translated as the configuration settings for the destination power block, with the two least significant bits being ignored. This may mean that occasionally the voltage output of the two power domains is not exactly the same but the voltage outputs match each other closely and within acceptable limits. If no voltage difference at all was to be tolerated the PMIC control circuitry would, in any case, be arranged not to set the output voltage of the source power block to a level which is not achievable by the destination power block.

In some instance however it may be necessary to modify the value of the configuration setting of the source power block to translate it to an appropriate configuration setting for the destination power block. This may be due to the power blocks having a different voltage output range. In some instances however it may be necessary to ensure that the voltage output of two power blocks have a certain voltage offset between them. For instance it may be that the Alive power domain 103d and processor domain 103a can safely operate with a voltage difference in the two domains of up to 500 mV. To conserve power the power block 109d powering the Alive power domain may therefore be arranged to have an output which is 500 mV below that of power block 109a powering the processor power domain.

In this case the translation logic is arranged to modify the translated settings to achieve a desired setting for the destination power block. The skilled person would be well aware of how to implement a desired modification in a translation logic circuit. As a simple example imagine that the source and destination power blocks have the same output voltage range and both have a four bit setting for output voltage and the least significant bit represents a voltage change of 250 mV. The modification is therefore effectively a digital subtraction of 0010. The skilled person would be well aware of how to implement such a translation in a logic arrangement. The modification may involve a look up table type arrangement such that for each possible value of source power block setting there is a corresponding value of destination power block setting which is output.

The PMIC may be arranged so that the destination power block is hardwired to use the translated settings from the source power block, but preferably the PMIC is configurable so that the destination can either use the translated settings or only settings that are written directly by the control circuitry. In other words the use of translated setting can be enabled or disabled. This configurability can be achieved in a variety of ways. The translation logic may be switched on or off, or access to the configuration settings of the source power block or the destination power block may be controlled with a switch. In one embodiment the configuration settings for the destination power block includes a translation enable/disable setting and, depending on the value of this setting the translated settings are used or not to provide the setting for the power block.

Figure 8:
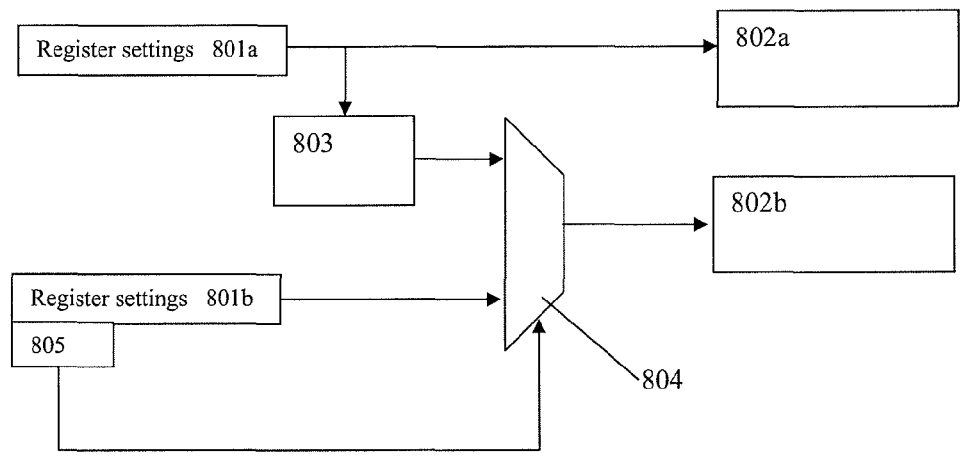
FIG. 8 illustrates an embodiment of the translation circuitry.

FIG. 8 shows one possible implementation of translation logic. A source power block includes power block circuitry 802a of a first power block responsive to the register settings 801a for that power block to control the output of the power block. A destination power block includes power block circuitry 802b which is responsive to either the register settings 801b of the destination power block or the register settings 801a of the source power block. A selector 804 which may for instance be a multiplexer is arranged to select the desired set of register settings in response to a select signal. In one embodiment the select signal is based on another register setting 805 of the destination power block. For example, register setting 805 may be a single bit indicating whether the destination power block is operated in coupled mode or stand-alone mode. A bit setting of 1 for example may indicate that the destination power block operates in stand-alone mode. In this case the selector 804 provides the destination power block circuitry 802b with the register settings 801b. These may be updated by the control circuitry of the PMIC as described previously. A bit setting of 0 for register 805 may indicate that the destination power block acts in coupled mode and the selector therefore provides the power block circuitry with the register settings 801a, i.e. the source power block register settings. Modification circuitry 803 may be arranged to convert the registers settings 801a to appropriate registers settings for the destination power block, for example using a look up table type arrangement as would be well understood by one skilled in the art.

Figure 9:
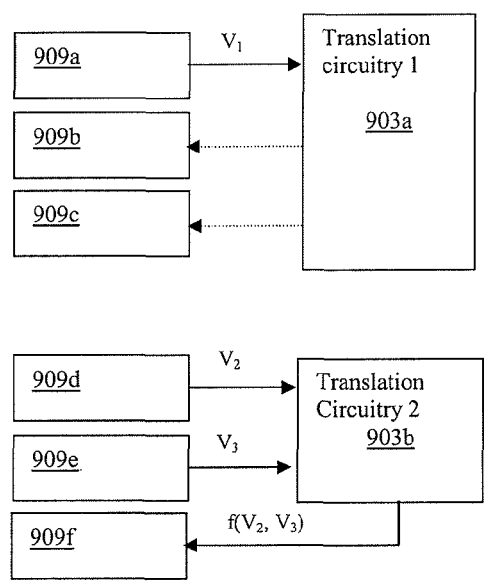
FIG. 9 illustrates a power management device having translation circuitry according a different embodiment of the invention.

Translation logic may be arranged to translate the settings from a source power block to more than one destination power block as shown in FIG. 9. Translation logic circuitry 903a is arranged to receive the output configuration settings from source power block 909a and to provide suitably translated configuration settings to any or all of power blocks 909b-c.

The PMIC may also have second independent translation circuitry 903b which is coupled to receive the settings of two power blocks, power block 909d and 909e and to supply appropriately translated settings to power block 909g. Some device sub-systems may communicate with multiple power domains and may need to match the operating voltage with that of the highest of the other domains. The second translation circuitry 903b may therefore be arranged to supply translated settings to power block 909g which sets the output voltage of that power block as equal to, or within a certain range of, whichever is the highest output voltage of power blocks 909e and 909f.

The use of the same design of PMIC for a variety of different devices can be advantageous but the various devices may have differing numbers of power domains that require powering. Thus the number of power blocks required may vary from device to device. Providing a large number of different power blocks may cater for most devices but clearly the greater the number of power blocks provided on the PMIC the greater the cost and size of the PMIC.

Therefore instead of providing all power blocks necessary for managing power to device sub-systems on the PMIC some external power blocks may be used to regulate power to some device sub-systems. The problem with use of external power blocks however is that the external power block is largely independent of the PMIC.

In one embodiment of the invention the control circuitry of the PMIC is arranged to provide control signals for control of an external power block, in particular sequencing control signals for activating or deactivating the external power block in a power state transition. As mentioned previously some power domains may need to be powered or depowered in a certain order in a power state transition and the PMIC provides sequencing control over the power blocks integrated within the PMIC. External power blocks are independent however and thus previously their use has been limited. This embodiment of the present invention provides the ability for the PMIC to manage a number of additional external power blocks.

Figure 10:
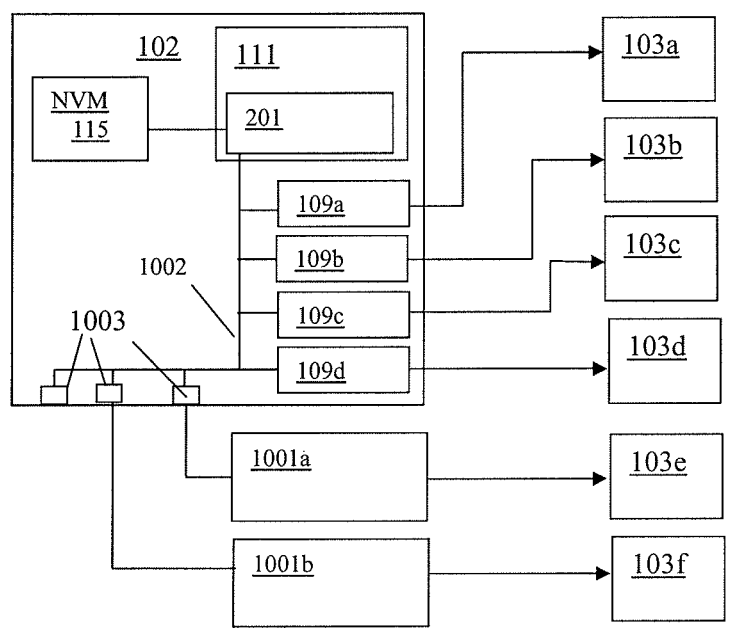
FIG. 10 illustrates a power management device according to another embodiment of the invention for providing sequencing control signals to external power blocks.

Referring to FIG. 10 a PMIC 102 according to this embodiment of the invention has control circuitry 111 arranged to provide control of a number of internal, integrated power blocks 109a-d including sequencing control. These power blocks 109a-d may be arranged to provide power to power domains 103a-d as described previously. In this embodiment however there are two additional power domains of the device, domains 103e and 103f, which require separate power supplies. The device may therefore include at least two additional power blocks 1001a and 1001b which are external power blocks for regulating the power supply. Each of the external power blocks 1001a, 1001b may comprise a regulator, such as a DC-DC Buck convertor, a DC-DC Boost Convertor or an LDO for example. The external power blocks receive power from the possible power supplies, i.e. from the internal battery or via a mains power interface or device-to-device interface, and regulate the power supply to the power domain based on their settings. Thus the external power blocks function in a similar fashion to the integrated power blocks 109a-d of the PMIC. The external power blocks may be connected to the available device power sources directly or may be connected via the PMIC.

In this embodiment of the present invention however the sequencing control 201 of the PMIC is arranged to control not only the integrated power blocks 109a-d but also a number of external power blocks as well. The control lines 1002 carrying the sequencing signals from the sequencer 201 carry the signals to the integrated power blocks 109-d and also to various outputs 1003 which may comprise one or more pins depending on the type of control signal. The external power blocks 1001a-b can be connected to the outputs by a suitable link and thus can be arranged to receive sequencing control signals to activate or deactivate them in response to an appropriate command. Thus the external power blocks 1001a-b can be activated/deactivated at an appropriate part of the sequence as if they were integrated power blocks. Thus the external power blocks can be used to power any device function.

The sequence for all of the integrated power blocks and any connected external power blocks should ideally be stored in memory, such as the NVM 115 for use in a boot sequence and the sequencer should ideally be adapted to allow for sequencing of all of these power blocks. In the example shown in FIG. 10 there are four internal, integrated power blocks and output connections for three external power blocks (even though only two are shown as being connected). Thus the PMIC memory should ideally be capable of storing a sequence for seven power blocks and the sequencer should ideally be capable of sequencing seven power blocks. In some instances however a plurality of external power blocks may be sequenced via one output by using a serial bus protocol or the like.

The PMIC may additionally or alternatively be arranged to provide control over output and/or operating mode of the external power blocks 1001a-b. The PMIC may be arranged to receive command and control signals from the power domains 103e and 103f and may be arranged to provide the same control over the external power blocks as if they were internal power blocks, e.g. setting output voltage.

In this way the PMIC can be designed with a useful number of power blocks for most applications but include a number of connections for control of external power blocks. When comparing a PMIC with four internal power blocks and connections for three external power blocks with a PMIC having seven internal power blocks it will be appreciated that memory and sequencing requirements will be largely the same in each case. However provision of at most three outputs pins with connections is much less expensive in terms of cost and space than providing three internal power blocks. Thus the PMIC of this aspect of the invention may be used in devices requiring four, five, six or seven power domains without involving any significant redundancy. If required additional external power blocks may be connected.

As shown the external power blocks are separate items but they could be integrated together. The external power blocks could be provided on a separate PMIC which is arranged as a slave PMIC to the master PMIC 102.

Whilst the above embodiments have been described in relation to a power management integrated circuit it will be clear that the embodiments of the invention can be applied generally to other forms of power management apparatus. The embodiments of the invention may be useful for power management of any form of electrical device, whether having a single power source or multiple power sources and whether portable or not. The embodiments of the present invention are particularly applicable to portable devices however such as: mobile computing devices such as laptops, netbooks, PDAs and the like; mobile communication devices such as radio telephones, cellular telephone, mobile email devices and the like; personal media players such as MP3 or other audio players, personal radios, video players; portable video game consoles and devices; personal navigation devices such as satellite navigators and GPS receivers, whether in-vehicle or hand-held or any other portable or battery operated device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

What is claimed is:

1. A power management integrated circuit being operable, in use, to provide a plurality of power states, wherein the power management integrated circuit is configured to transition from a present power state to another power state in response to a power state transition command, and wherein the power management integrated circuit is arranged to provide a predetermined delay between receipt of a power state transition command and start of the appropriate power state transition, wherein the power management integrated circuit is configured to receive at least some power state transition commands from an operating system of a host device and to apply said predetermined delay in response to a power state transition command received from said operating system, wherein the duration of the predetermined delay is configurable.

2. A power management integrated circuit as claimed in claim 1 wherein the power management integrated circuit is arranged, on receipt of a power transition command, to send a power transition indication signal to at least one output.

3. A power management integrated circuit as claimed in claim 2 wherein the power transition indication signal is an interrupt signal for a device processor.

4. A power management integrated circuit as claimed in claim 1 wherein the predetermined delay is within a range of 1 ms-10 s inclusive.

5. A power management integrated circuit as claimed in claim 1 wherein the duration of the delay is based on a delay setting and wherein the power management integrated circuit is adapted to update the delay setting in response to an appropriate command input.

6. A power management integrated circuit as claimed in claim 1 comprising, or adapted to communicate with, a sequencer for controlling power blocks involved in a power state transition sequence wherein the power management integrated circuit is adapted to implement the predetermined delay prior to initializing said sequencer.

7. A power management integrated circuit as claimed in claim 1 comprising, or adapted to communicate with, a sequencer for controlling power blocks involved in a power state transition sequence wherein at least part of the delay is provided by reserving a plurality of time slots of the sequencer as inactive.

8. A power management integrated circuit as claimed in claim 1 wherein the power management integrated circuit applies the predetermined delay on receipt of any power state transition command.

9. A power management integrated circuit as claimed in claim 1 adapted to, on power up of the power management integrated circuit, to set the duration of the predetermined delay based on a setting in a non-volatile memory.

10. A power management integrated circuit as claimed in claim 1 comprising control circuitry configurable to control at least one power block external to the power management integrated circuit and output power block control signals to at least one power block control output.

11. A power management integrated circuit as claimed in claim 10 wherein the control circuitry for controlling at least one external power block comprises sequencing circuitry for activating or deactivating the power blocks in a specified sequence in a transition from one power state to a different power state.

12. A power management integrated circuit as claimed in claim 10 wherein the control circuitry comprises circuitry to provide control over the configuration settings of the at least one power block external to the power management integrated circuit.

13. A device comprising a power management integrated circuit as claimed in claim 10 and at least one additional power block external to the power management integrated circuit, the additional power block being connected to a power block control output interface.

14. A device as claimed in claim 13 comprising two or more additional power blocks integrated together.

15. A device as claimed in claim 13 wherein said power management integrated circuit is a first power management integrated circuit and the device comprising an additional power management integrated circuit arranged as a slave to the first power management integrated circuit.

16. A device comprising a power management integrated circuit as claimed in claim 1 and a processor, wherein the power management integrated circuit is adapted to, on receipt of a power state transition command that does not originate from the processor, to send a power state change notification signal to the processor.

17. A device as claimed in claim 16 wherein the processor is adapted, on receipt of said power state change signal, to terminate any active processes and/or prevent start of processes not related to a power state transition.

18. A device comprising a power management integrated circuit as claimed in claim 1 and a processor, wherein the predetermined delay applied varies according to processor usage at the time of receipt of a power state transition command.

19. A device as claimed in claim 18 wherein the delay applied is based on a delay setting that is updated by the processor based on usage.

20. A power management integrated circuit for managing power supply to a device, the integrated circuit being operable, in use, to provide a plurality of power states, wherein the integrated circuit is configured to transition from a current power state to another power state in response to a power state transition command, and wherein the integrated circuit is configurable so that a predetermined delay can be applied between receipt of a power state transition command and start of the appropriate power state transition, and wherein the integrated circuit is also configurable so that no delay is applied between receipt of a power state transition command and start of the appropriate power transition, and wherein the integrated circuit is configured to receive at least some power state transition commands from an operating system of a host device and is configurable to apply said predetermined delay in response to a power state transition command received from said operating system.

21. A method of performing a power state transition in a device comprising the steps of:
receiving in a power management integrated circuit of the device a power state transition command from an operating system of the device;
applying a predetermined delay, wherein the duration of the predetermined delay is configurable; and
after said predetermined delay, starting the appropriate power transition.

22. A method as claimed in claim 21 wherein the power state transition command is received from a device processor.

23. A method as claimed in claim 21 wherein the predetermined delay applied has a duration based on a delay setting.

24. A device comprising a power management integrated circuit according to claim 1.

25. A device according to claim 24 wherein the device is a portable electronic device.

26. A device according to claim 24 wherein the device is at least one of: a computing device; a laptops; a notebook computer; a PDA; a media players; an MP3 player; a video player; a portable television device; a communication device; a mobile telephone; a mobile email device; GPS devices or a navigation device.

27. A power management integrated circuit as claimed in claim 1 where the power management integrated circuit is configured to receive at least some power state transition commands from a device processor and to apply said predetermined delay in response to a power state transition command received from said device processor.

28. A power management integrated circuit being operable, in use, to provide a plurality of power states, wherein the power management integrated circuit is configured to transition from a present power state to another power state in response to a power state transition command, and wherein the power management integrated circuit is arranged to provide a predetermined delay between receipt of a power state transition command and start of the appropriate power state transition, wherein the power management integrated circuit is configured to receive at least some power state transition commands from an operating system of a host device and to apply said predetermined delay in response to a power state transition command received from said operating system, wherein the power management integrated circuit is arranged, on receipt of a power transition command, to send a power transition indication signal to at least one output, wherein the power transition indication signal is an interrupt signal for a device processor.

29. A power management integrated circuit being operable, in use, to provide a plurality of power states, wherein the power management integrated circuit is configured to transition from a present power state to another power state in response to a power state transition command, and wherein the power management integrated circuit is arranged to provide a predetermined delay between receipt of a power state transition command and start of the appropriate power state transition, wherein the power management integrated circuit is configured to receive at least some power state transition commands from an operating system of a host device and to apply said predetermined delay in response to a power state transition command received from said operating system, and wherein the power management integrated circuit is adapted to, on power up of the power management integrated circuit, to set the duration of the predetermined delay based on a setting in a non-volatile memory.

* * * * *